(12) United States Patent  (10) Patent No.: US 8,622,300 B2
Lawson et al.  (45) Date of Patent: Jan. 7, 2014

(54) SYSTEM AND METHOD FOR DATA CARD EMULATION

(75) Inventors: Lance P. Lawson, San Jose, CA (US); Marla Miller, San Jose, CA (US); Larry W. Fullerton, New Hope, AL (US); Mark D. Roberts, Huntsville, AL (US)

(73) Assignee: Cedar Ridge Research, LLC, New Hope, AL (US)

( * ) Notice: Subject to any disclaimer, the term of this patent is extended or adjusted under 35 U.S.C. 154(b) by 0 days.

(21) Appl. No.: 13/431,289

(22) Filed: Mar. 27, 2012

(65) Prior Publication Data

US 2012/0241519 A1  Sep. 27, 2012

Related U.S. Application Data

(63) Continuation of application No. 12/380,058, filed on Feb. 23, 2009, now Pat. No. 8,141,780.

(60) Provisional application No. 61/066,832, filed on Feb. 23, 2008.

(51) Int. Cl.
*G06K 7/10* (2006.01)

(52) U.S. Cl.
USPC .......................................... 235/454; 235/379

(58) Field of Classification Search
USPC .................... 235/379, 375, 487, 454
See application file for complete search history.

(56) References Cited

U.S. PATENT DOCUMENTS

| | | |
|---|---|---|
| 4,701,601 A * | 10/1987 | Francini et al. ............... 235/449 |
| 5,450,491 A | 9/1995 | McNair |
| 5,789,732 A | 8/1998 | McMahon |
| 5,872,834 A | 2/1999 | Teitelbaum |
| 5,939,699 A | 8/1999 | Perttunen |
| 6,073,840 A | 6/2000 | Marion |
| 6,089,284 A | 7/2000 | Kaehler |
| 6,098,879 A | 8/2000 | Terranova |
| 6,116,505 A | 9/2000 | Withrow |
| 6,315,195 B1 | 11/2001 | Ramachandran |
| 6,422,464 B1 | 7/2002 | Terranova |
| 6,442,532 B1 | 8/2002 | Kawan |
| 6,470,233 B1 | 10/2002 | Johnson |
| 6,487,540 B1 | 11/2002 | Smith |
| 6,519,329 B1 | 2/2003 | Hjelmvik |
| 6,529,880 B1 | 3/2003 | McKeen |
| 6,574,603 B1 | 6/2003 | Dickson |
| 6,587,835 B1 | 7/2003 | Treyz |
| 6,678,666 B1 | 1/2004 | Boulware |
| 6,687,346 B1 | 2/2004 | Swartz |
| 6,714,918 B2 | 3/2004 | Hillmer et al. |
| 6,764,003 B1 | 7/2004 | Martschitsch et al. |
| 6,850,901 B1 | 2/2005 | Hunter et al. |

(Continued)

*Primary Examiner* — Karl D Frech

(57) ABSTRACT

An improved system and method for data card emulation is provided that enables a single data card to emulate any one of multiple data cards. The data card includes an improved system and method for conveying data involving pulsed light that can read a barcode and can emulate a barcode. The improved system and method for conveying data may also include at least one of a magnetic stripe reader or a magnetic stripe emulator. The data card uses the improved system and method for conveying data to interface with conventional barcode and/or magnetic stripe readers, to interface with other such data cards or other devices having similar circuitry, and to interface with a data management system used to manage barcode and/or magnetic stripe information stored in a memory on the data card.

20 Claims, 21 Drawing Sheets

(56) References Cited

U.S. PATENT DOCUMENTS

| | | |
|---|---|---|
| 6,940,393 B2 | 9/2005 | Dev |
| 6,947,571 B1 | 9/2005 | Rhoads |
| 6,969,002 B2 | 11/2005 | Creamer |
| 6,980,970 B2 | 12/2005 | Krueger |
| 6,991,155 B2 | 1/2006 | Burchette |
| 7,014,109 B2 | 3/2006 | Hjelmvik |
| 7,209,903 B1 | 4/2007 | Mamdani |
| 7,347,361 B2 | 3/2008 | Lovett |
| 7,543,741 B2 | 6/2009 | Lovett |
| 7,810,720 B2 | 10/2010 | Lovett |
| 2001/0051531 A1 | 12/2001 | Singhal |
| 2002/0085515 A1 | 7/2002 | Jaynes |
| 2002/0088853 A1 | 7/2002 | Itoh |
| 2004/0024650 A1 | 2/2004 | Chen |
| 2004/0148253 A1 | 7/2004 | Shin |
| 2005/0211771 A1 | 9/2005 | Onozu |
| 2007/0088624 A1 | 4/2007 | Vaughn |

\* cited by examiner

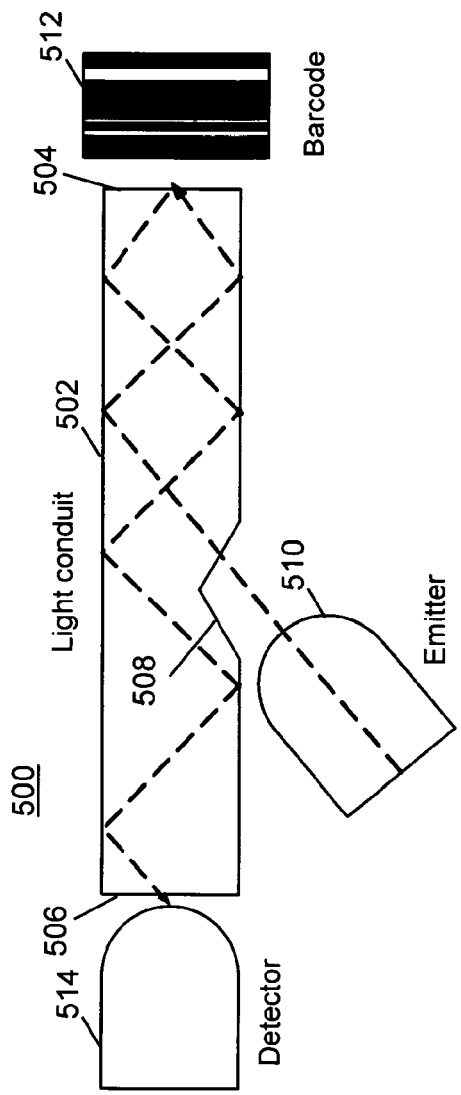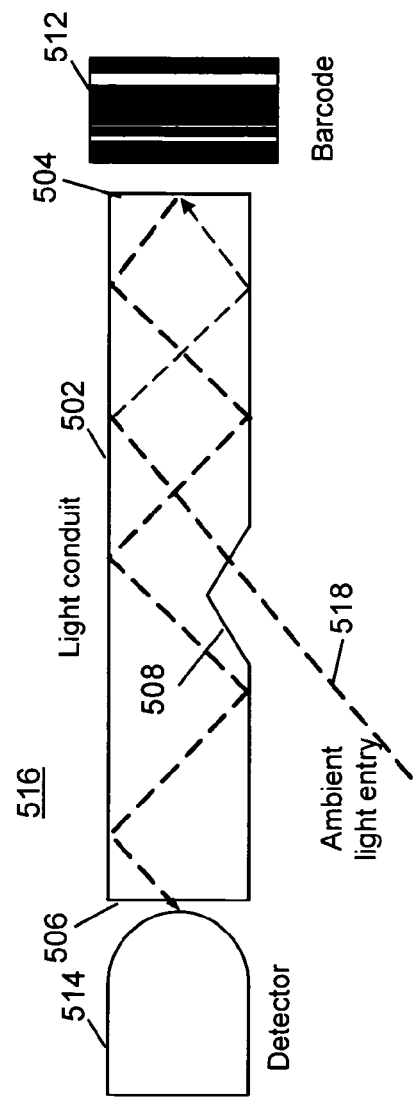
Fig. 5a
Fig. 5b

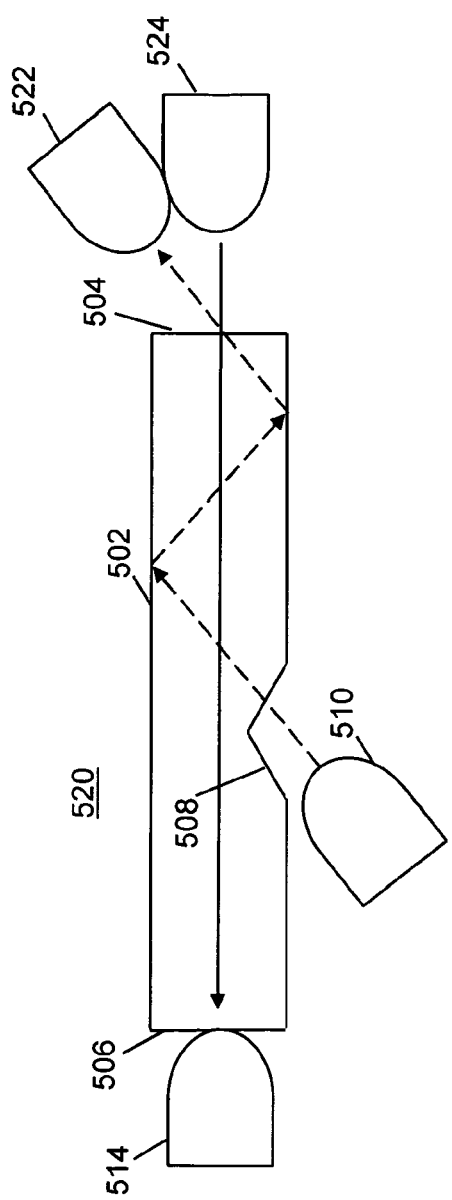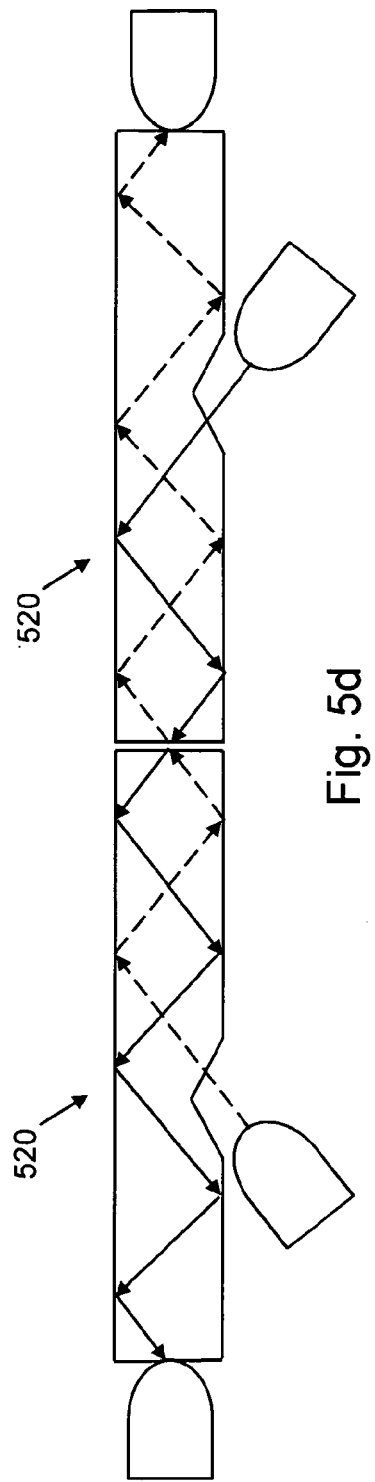
Fig. 5c
Fig. 5d

CardCard Data Management System

304

Available Functions:
1. Manage local database of entities (add/delete/edit records).
2. Manage CardCard database of entities (add/delete/edit records).
3. Synchronize local and CardCard databases.
4. Log on to CardCard Website.
5. Log on to Entity Website.
6. Erase CardCard.
7. Copy CardCard.
8. Produce Report (Local database, CardCard database, usage, etc.)
9. Scan CardCard for entity data card information.
10. Add entity data card information to CardCard.

Select Function: ____

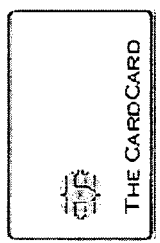

This website sponsored by: Entity N-6

Select Entity Types of Interest:
○ Entity Type A  ○ Entity Type E  ○ Entity Type I  ○ Entity Type M  ○ Entity Type Q  ⟋902
● Entity Type B  ○ Entity Type F  ● Entity Type J  ● Entity Type N  ○ Entity Type R
○ Entity Type C  ● Entity Type G  ○ Entity Type K  ○ Entity Type O  ● Entity Type S
○ Entity Type D  ○ Entity Type H  ○ Entity Type L  ○ Entity Type P  ● Entity Type T Select Entity Data Cards to Download to CardCard:
● Entity B-1   ● Entity B-5   ○ Entity B-9    ⟋904
● Entity B-2   ○ Entity B-6   ○ Entity B-10
○ Entity B-3   ○ Entity B-7   ○ Entity B-11
○ Entity B-4   ○ Entity B-8

○ Entity E-1
○ Entity E-2   ○ Entity E-5
● Entity E-3   ○ Entity E-6
○ Entity E-4   ● Entity E-7
               ○ Entity E-8

○ Entity G-1   ○ Entity G-5   ○ Entity G-9    ○ Entity G-13
● Entity G-2   ● Entity G-6   ○ Entity G-10   ● Entity G-14
○ Entity G-3   ○ Entity G-7   ○ Entity G-11   ○ Entity G-15
○ Entity G-4   ● Entity G-8   ○ Entity G-12   ○ Entity G-16

. . .

Entity B-2 Logo    Entity G-7 Logo    Entity J-2 Logo    Entity N-1 Logo ( DOWNLOAD ENTITY INFORMATION )

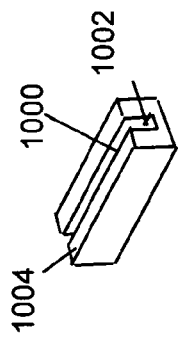
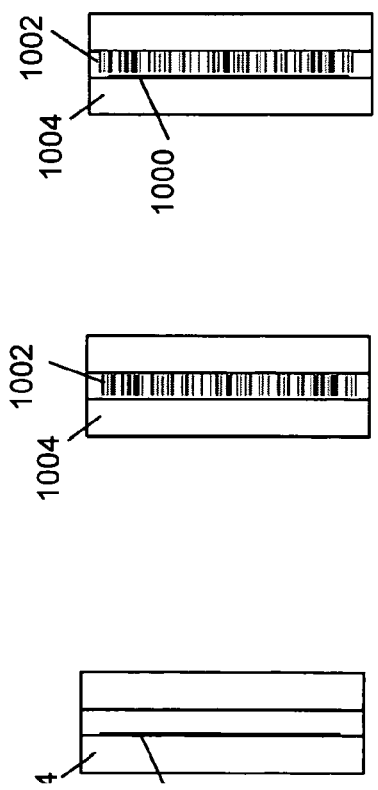
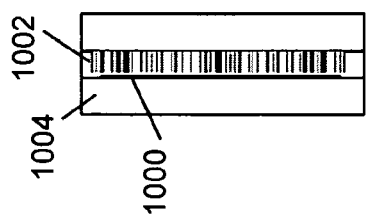
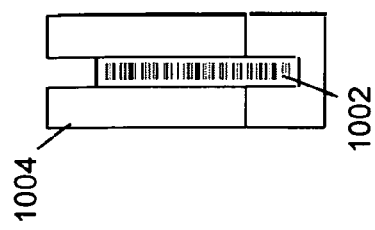

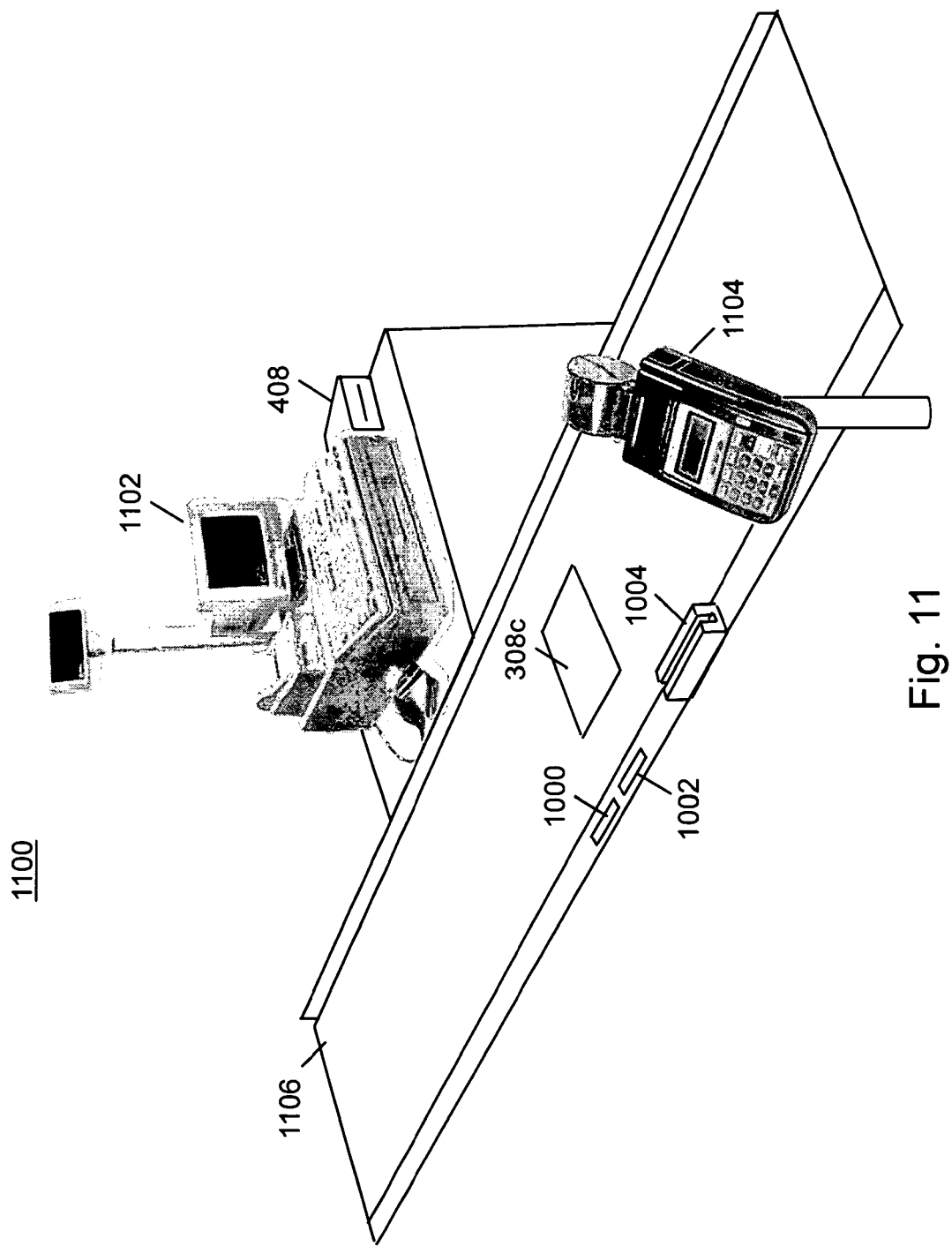

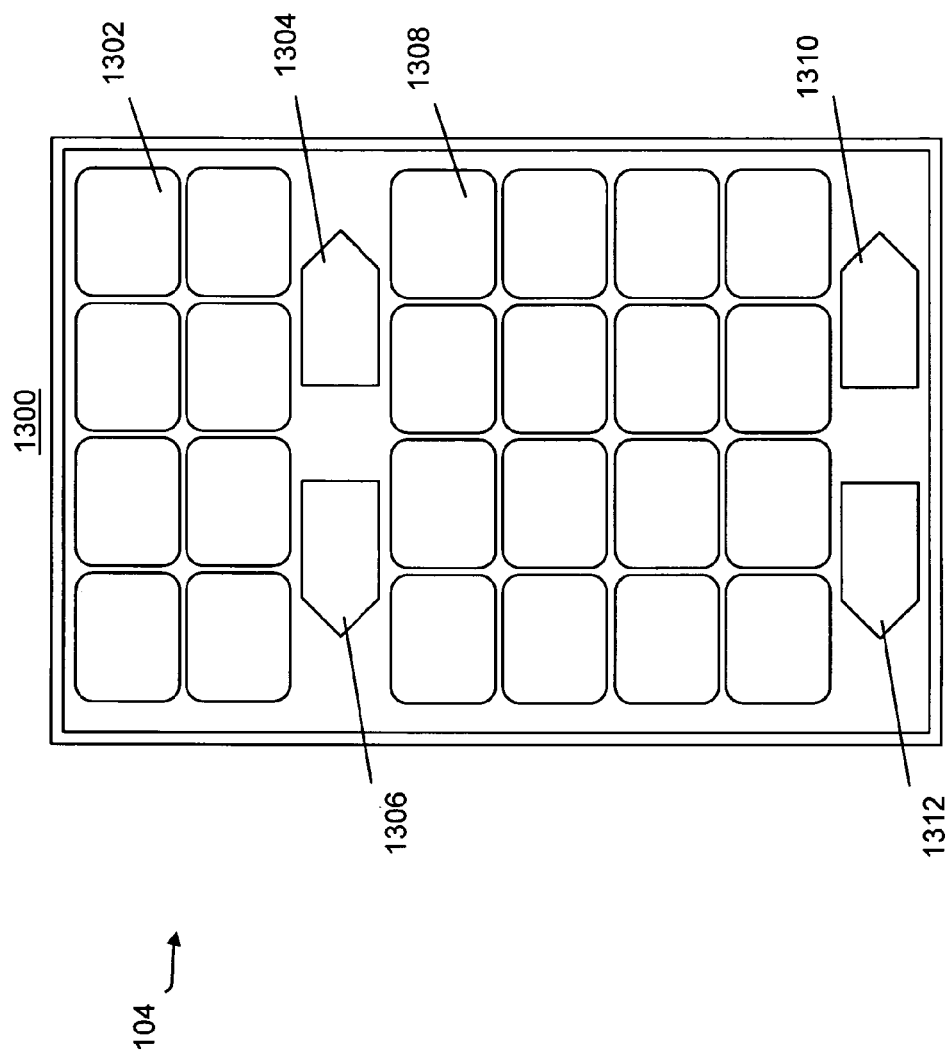

US 8,622,300 B2

SYSTEM AND METHOD FOR DATA CARD EMULATION

CROSS-REFERENCE TO RELATED APPLICATIONS

This Non-provisional Application is a continuation of U.S. Non-provisional application Ser. No. 12/380,058, titled "System and Method for Data Card Emulation" filed Feb. 23, 2009 by Lawson et al., which claims the benefit under 35 U.S.C. 119(e) of U.S. Provisional Application Ser. No. 61/066,832, filed Feb. 23, 2008 by Lawson et al., titled "System and Method for Data Card Emulation"; the above listed applications are incorporated by reference herein in their entirety.

FIELD OF THE INVENTION

The present invention relates generally to a system and method for data card emulation. More particularly, the present invention relates to the use of pulsed light and/or magnetic field technology to read and write bar code information such that a single data card can emulate multiple data cards having different bar codes and/or magnetic stripes.

BACKGROUND OF THE INVENTION

It is quite common for a person to currently have to carry many different types of data cards in their wallet or purse. Such data cards include credit cards, debit cards, loyalty cards, identification cards, and the like. Keeping track of such cards and being able to quickly locate such cards can be quite cumbersome. Therefore, there is a need for an improved system and method for a single card to function as multiple data cards.

SUMMARY OF THE INVENTION

The present invention is an improved system and method for data card emulation. A single data card is able to emulate, or function as, any one of many different types of cards that a person might otherwise have to carry in a wallet or purse. This improved system for data card emulation, often referred to herein as CardCard, includes an improved system for conveying data that enables the card to both read and write information. As such, various types of card information such as barcode and/or magnetic stripe information for multiple data cards can be read into the CardCard, stored in a memory, and then later used (in write mode) to emulate a given data card. The CardCard can also operate in a transceiver mode whereby it can communicate with another CardCard (also operating in a transceiver mode) or with some other comparable transceiver device. Various techniques are provided for identifying which entity's data card to emulate. Under one arrangement, the CardCard communicate with another device to determine which entity's card to emulate. Under another arrangement, an interface on the card is used to select an entity to emulate. A CardCard data management system is provided to manage the data residing in a CardCard's memory. In another embodiment, the improved system for conveying data is integrated into a cell phone, a smart card, a personal digital assistant (PDA), a watch, a keychain, a kiosk, or other object enabling that object to read and write information as if it were a Card-Card.

The improved system for conveying data of the invention includes a first light conduit having a first opening at a first end, a second opening at a second end, and a side opening. It also includes a first light source that outputs a first light that initially enters the first light conduit through the side opening, reflects off the first light conduit, and exits the first opening. It also includes a first detector that detects a second light and a first processor interfaced with the first detector, where the first processor conveys data based on at least one of the first light or the second light.

Under one arrangement, after exiting the first opening the first light encounters a barcode having black lines and white lines. The first light is absorbed by the black lines and reflected by the white lines thereby producing the second light such that the data conveyed by the second light corresponds to barcode information in accordance with the barcode. The barcode can be passed by the first opening or the first opening can be passed by the barcode. The barcode can be on a data card or on another object. The barcode can distinguish one of a plurality of entities associated with a data card.

The first light source can be a light emitting diode (LED) or can be an ambient light source.

The system can be integrated into one of a data card, a cellular phone, a smart phone, a PDA, a watch, a keychain, a kiosk, a point-of-sale device, a data management device, a portable object, or a fixed object. It may also include at least one of a first memory, a first battery, a first switch, a first light waveguide, a first status indicator, or a first display.

Under one arrangement, the second light enters the first light conduit through the first opening and exits the second opening. Under another arrangement, the second light reflects off the first light conduit after entering the first opening and before exiting the second opening.

The first light source can be interfaced with the first processor and can output the first light in accordance with a barcode pattern. Under one arrangement, the first light source and the first detector can function as a first transmitter and a first receiver of a first pulsed light transceiver. The first pulsed light transceiver can use On-Off-Keying (OOK).

The improved system for conveying data can include a second light source that outputs the second light that initially enters the first light conduit through the first opening and exits the second opening. The improved system can also include a second detector for detecting the first light having exited the first opening and a second processor interfaced with the second light source and the second detector that conveys data based on at least one of the first light or the second light.

The improved system for conveying data can also include a second light conduit where the first light reflects through the first light conduit and then reflects through the second conduit prior to being detected by the second detector and the second light reflects through the second light conduit and then reflects through the first conduit prior to being detected by the first detector.

Under one arrangement, the second light source outputs the second light through a side opening in the second light conduit.

The improved system for conveying data can also include at least one of a second memory, a second battery, a second switch, a second light waveguide, a second status indicator, or a second display.

The improved system for conveying data can also include at least one of a magnetic stripe detector or a magnetic stripe emulator.

BRIEF DESCRIPTION OF THE DRAWINGS

The present invention is described with reference to the accompanying drawings. In the drawings, like reference numbers indicate identical or functionally similar elements.

Additionally, the left-most digit(s) of a reference number identifies the drawing in which the reference number first appears.

FIG. 5a depicts an exemplary bar code reader in accordance with another embodiment of the present invention;

FIG. 5b depicts an alternative bar code reader in accordance with still another embodiment of the present invention;

FIG. 5c depicts a barcode reader/emulator-light transceiver operating as an OOK pulsed light transceiver with a second detector and second light source functioning as a second OOK pulse light transceiver;

FIG. 5d depicts a first barcode reader/emulator-light transceiver and a second barcode reader/emulator-light transceiver operating in the light transceiver mode;

FIG. 8 depicts an exemplary CardCard Data Management System;

FIG. 9 depicts an exemplary CardCard Website;

FIG. 10a depicts an exemplary magnetic stripe;

FIG. 10b depicts an exemplary barcode;

FIG. 10c depicts a top down view of an exemplary entity identifying device having a magnetic stripe along one side of a slot;

FIG. 10d depicts a top down view of an exemplary entity identifying device having a barcode along the bottom of a slot;

FIG. 10e depicts a top down view of an exemplary entity identifying device having a magnetic stripe along one side of a slot and a barcode along the bottom of the slot;

FIG. 10f depicts a first three dimensional view of an exemplary entity identifying device;

FIG. 10g depicts a second three dimensional view of an exemplary entity identifying device;

FIG. 11 depicts an exemplary usage of a CardCard at an entity point-of-sale;

FIG. 13a depicts an exemplary CardCard display;

DETAILED DESCRIPTION OF THE INVENTION

The present invention will now be described more fully in detail with reference to the accompanying drawings, in which the preferred embodiments of the invention are shown. This invention should not, however, be construed as limited to the embodiments set forth herein; rather, they are provided so that this disclosure will be thorough and complete and will fully convey the scope of the invention to those skilled in the art Like numbers refer to like elements throughout.

The present invention provides a system and method for data card emulation. Specifically, the present invention involves a data card referred to herein as CardCard that is able to emulate any one of a plurality of data cards. The CardCard will work with existing data card infrastructure in the same manner as if a user used a different one of the plurality of data cards at respective entities (e.g., businesses).

Figure 1:
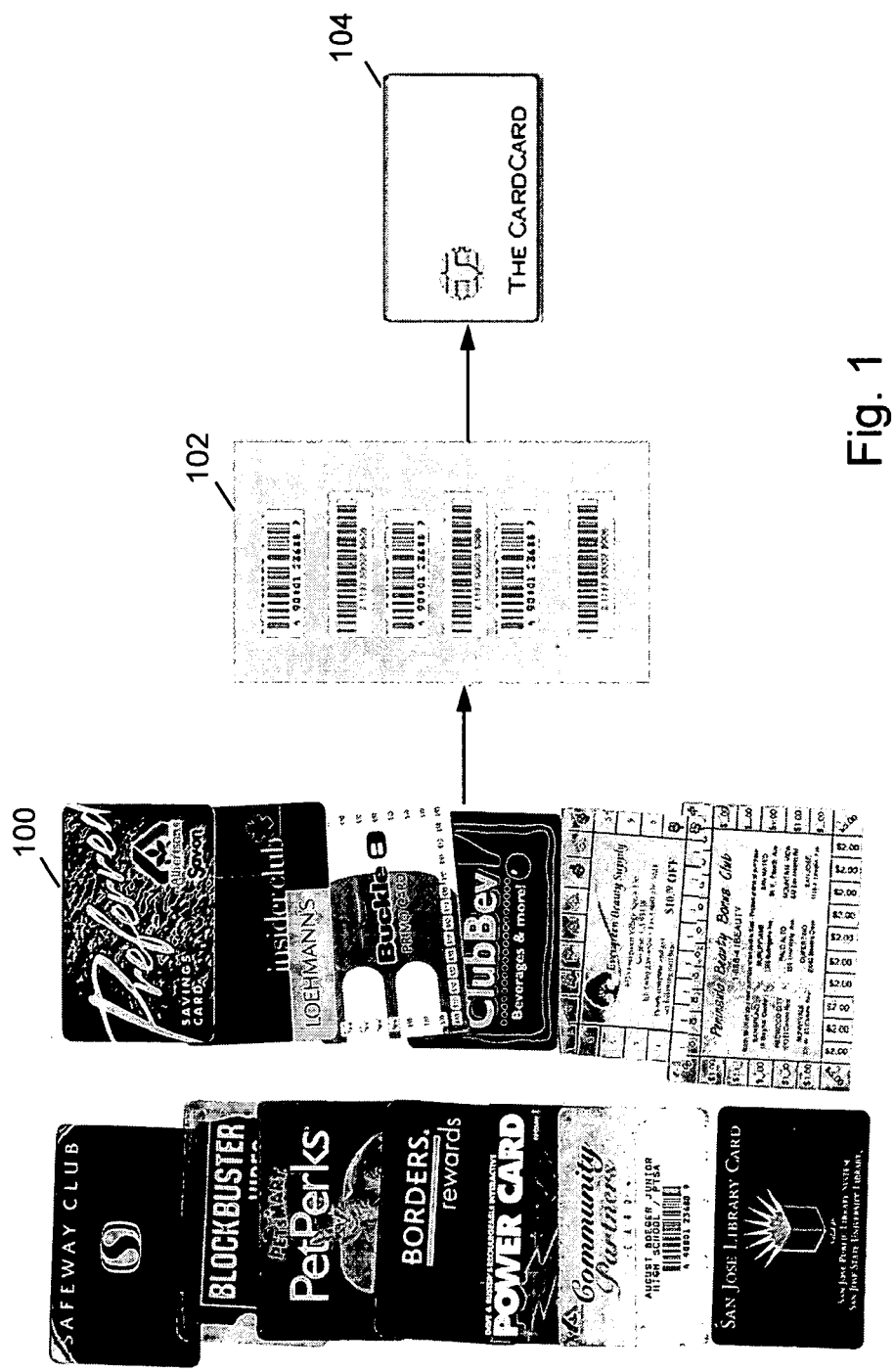
FIG. 1 illustrates the basic concept of the present invention where one data card referred to herein as CardCard is able to emulate any one of a plurality of data cards.

FIG. 1 illustrates the basic concept of the present invention where one data card is able to emulate any one of a plurality of data cards. Referring to FIG. 1, a plurality of data cards 100, for example, includes various types of loyalty cards. The plurality of data cards 100 could alternatively or additionally include various types of transaction cards such as credit cards or debit cards, and generally could include any kind of data card having a barcode and/or magnetic stripe. Barcode information and/or magnetic stripe information 102 is stored on a CardCard 104 such that the CardCard 104 can emulate any one of the plurality of data cards 100 by emulating the barcode and/or magnetic stripe information normally conveyed by the card.

Figure 2:
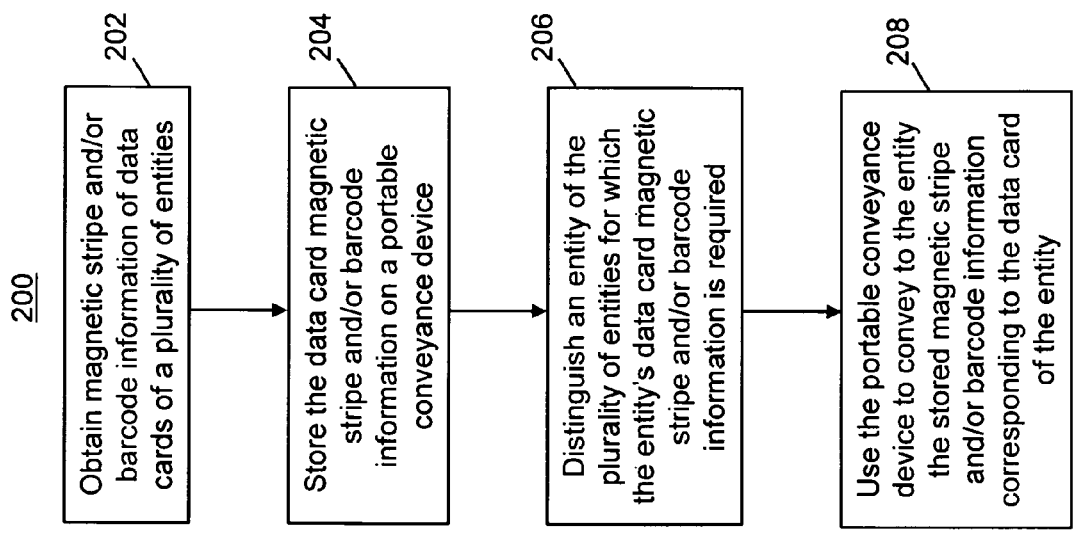
FIG. 2 depicts an exemplary method of the present invention.

FIG. 2 depicts an exemplary method of the present invention. Referring to FIG. 2, the method 200 comprises a first step 202 which is to obtain magnetic stripe and/or barcode information of a plurality of data cards corresponding to a plurality of entities. The magnetic stripe and/or barcode information is stored on a portable conveyance device in a second step 204. The portable conveyance device may, for example, resemble a typical data card. In a third step 206, an entity is distinguished corresponding to one of the plurality of cards for which the magnetic stripe and/or barcode information is required. In a fourth step 208, the portable conveyance device conveys to the entity the magnetic stripe and/or barcode emulation corresponding to the entity's data card.

In accordance with the invention, the magnetic stripe and/or barcode information of a plurality of data cards corresponding to a plurality of entities can be obtained in one or more of several ways including reading such information directly from individual data cards or receiving a data file or other data stream that includes such information corresponding to one or more data cards. Once obtained, such information can be stored (or otherwise described) in a memory for later use. An entity can be distinguished using various approaches including using a user interface of the portable conveyance device or a user interface of a computing device associated with the portable conveyance device to select the entity. Alternatively, a radio frequency transmission or other form of transmission could be received by the portable conveyance device or a computing device associated with the portable conveyance device, or a barcode, magnetic stripe, or other recognizable information associated with the entity could be recognized (or read) by the portable conveyance device or by a computing device associated with the portable conveyance device. Similarly, magnetic stripe and/or barcode information corresponding to the distinguished entity can be conveyed via a writeable magnetic stripe and/or a display, via an emulation approach whereby existing infrastructure reads the information as if reading the actual entity data card, or via a transmission from the portable conveyance device to a device associated with the entity that is capable of receiving the transmission, which would convey the magnetic stripe and/or barcode information corresponding to the entity (and the user of the portable conveyance device). Under one approach, a device associated with the entity would communicate with the portable conveyance device as required to search the memory of the portable conveyance device to locate and retrieve the magnetic stripe and/or barcode information that it would recognize as corresponding to one of its data cards.

Figure 3:
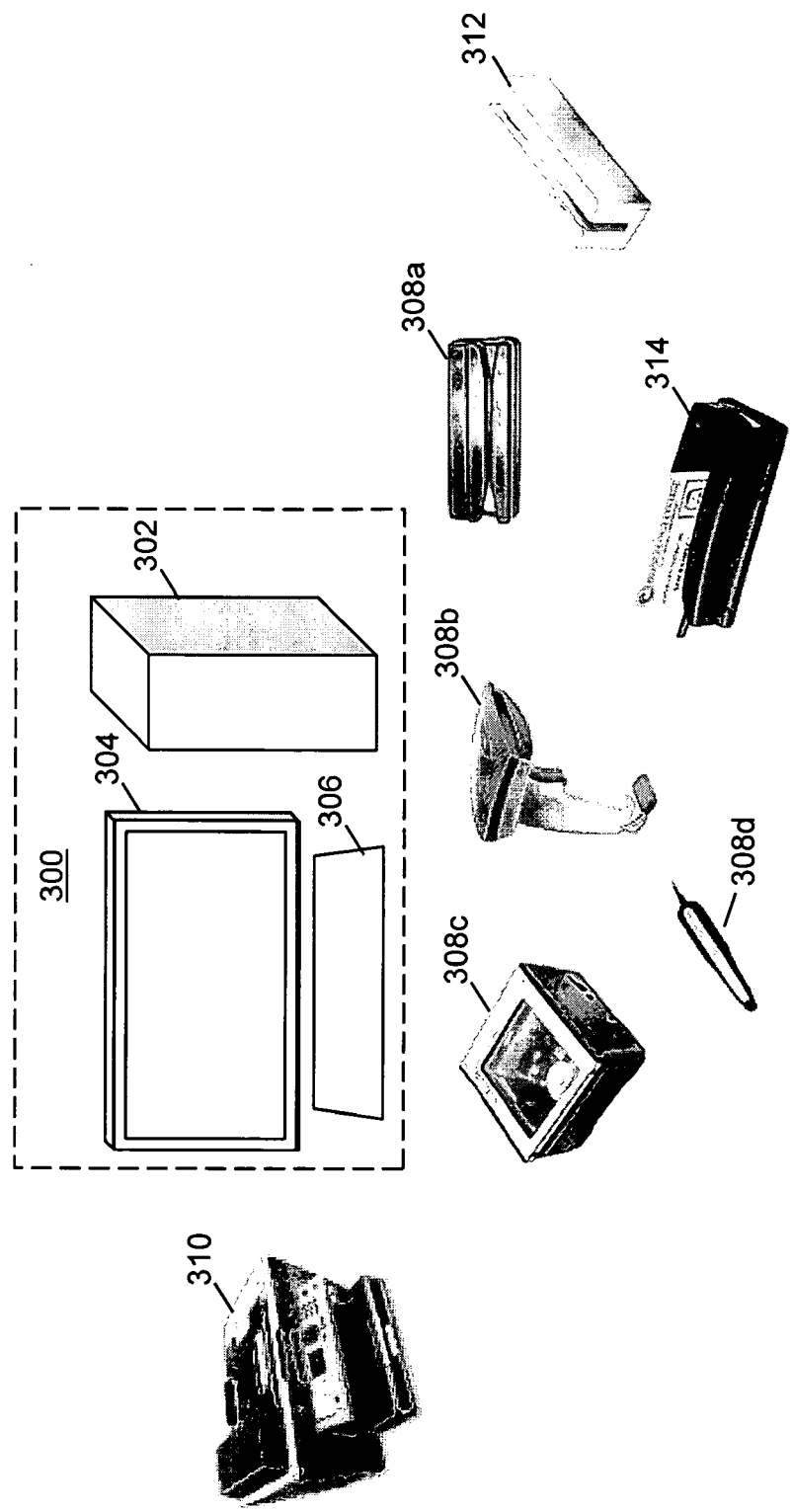
FIG. 3 depicts various devices that can be used to obtain barcode and/or magnetic stripe information from a data card.

FIG. 3 depicts various devices that can be used to obtain barcode and/or magnetic stripe information from a data card. Referring to FIG. 3, a computer system 300 includes a computer 302, a display 304, and a keyboard 306 that can be used to receive and store information obtained from such devices. The computer system 300 may be located, for example, in a home or business. Various examples of barcode readers (or scanners) 308a-308d are depicted including a slot reader 308a, a handheld reader 308b, a horizontal scanner 308c, and a pen type barcode reader 308d. Also shown is a computer printer 310 having scanning capabilities. FIG. 3 also depicts a magnetic stripe reader 312 and a combination barcode/magnetic stripe reader 314. In accordance with the present invention, any of a variety of reader/scanner devices can be used to obtain barcode and/or magnetic stripe information that can be communicated via a wire or wirelessly to a computer system where it can be managed as desired. Such barcode and/or magnetic stripe information can also be transferred to or from the computer system 300 over a network, for example, the Internet.

Figure 4B:
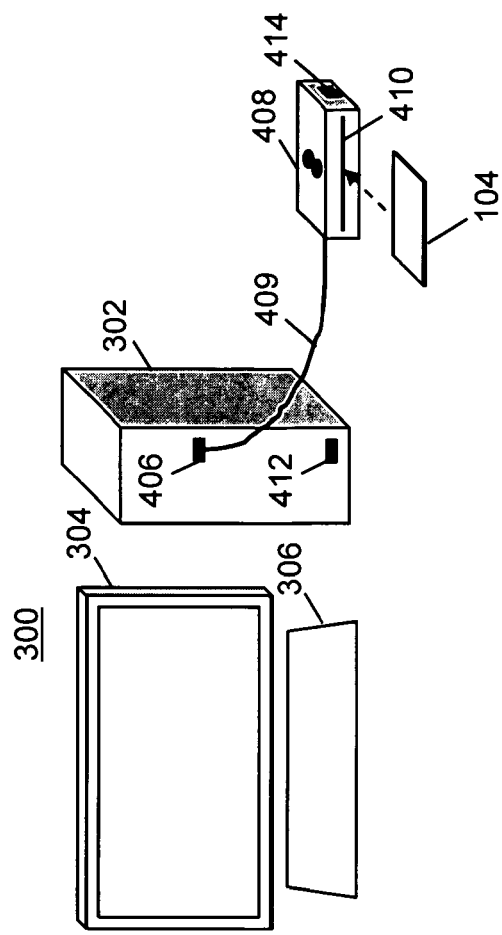
FIG. 4b depicts an exemplary CardCard data management device in accordance with one embodiment of the present invention.
Figure 4A:
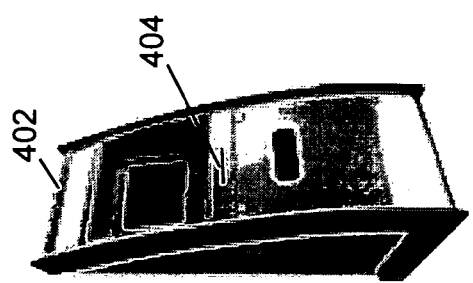
FIG. 4a depicts an exemplary kiosk that can be used to manage data on the CardCard.

FIG. 4a depicts an exemplary kiosk 402 that can be used to manage the data stored on the CardCard. In accordance with the present invention, a CardCard user would place his or her CardCard 104 into a slot 404 in the kiosk 402. The kiosk 402 provides an interface for the user to add, delete, or modify information pertaining to a data card of one or more entities (e.g., a vendor, a school, etc). For example, a kiosk might be used in a mall to allow shoppers to populate their CardCard with the data card information of one or more of the stores in the mall at which the shopper likes to shop. Such data card information would typically include an identifier (e.g., name) for the entity, barcode information and/or magnetic stripe information, and possibly a logo.

FIG. 4b depicts an exemplary CardCard data management device in accordance with one embodiment of the present invention. Referring to FIG. 4b, a computer system 300 includes a computer 302 that has a data port 406, for example a Universal Serial Bus (USB) port, to which a CardCard data management device 408 is connected via a cable, for example, a USB cable 409. Optionally, a CardCard data management device 408 may be connected wirelessly to a computer 302. The CardCard data management device 408 includes a slot 410 in which a CardCard 104 is inserted. Thereafter, the CardCard data management device 408 interfaces with the CardCard 104 as required to manage information maintained on the CardCard 104 to include adding a vendor's data card information to the CardCard 104 at a Point-of-sale (POS). Under one arrangement, one or more barcode and/or magnetic stripe reader/scanner devices like or similar to those described in relation to FIG. 3 are associated with one or more other data ports 412 of the computer 302. Under another arrangement, such reader/scanner devices are associated with one or more other data ports 414 of the CardCard data management device 408.

The invention includes several embodiments of an improved system for conveying data that enable a CardCard to read and write barcode and/or magnetic stripe information and to function as a transceiver. Depending on the embodiment, this improved system for conveying data is also referred to herein as a barcode reader, barcode emulator, barcode reader/emulator, light transceiver, magnetic stripe detector, magnetic strip emulator, or a magnetic field transceiver.

FIG. 5a depicts an exemplary barcode reader in accordance with another embodiment of the present invention. Referring to FIG. 5a, a barcode reader 500 includes a light conduit 502 having a first opening 504 at one end, a second opening 506 at the other end, and a side opening 508. Light from a light source 510, for example a light emitting diode (LED), enters the side opening 508 and reflects through the light conduit 502 where it then reflects off a barcode 512 of a data card being passed by the first opening 504. The light then reflects through the light conduit 502 and exits the second opening 506 where it is detected by a detector 514. Alternatively, the first opening 504 of a barcode reader 500 can be moved relative to a stationary barcode 512. As such, when reading a barcode, a barcode reader 500 requires the same relative movement as does a pen type barcode reader 308d. Light from a light source 510 is absorbed by the black lines and reflected by the white lines of barcode 512. The detector therefore detects the presence or absence of light over time, which corresponds to the barcode sequence. Under one arrangement, the light conduit 502 is substantially flat allowing it to be configured within a data card. Under another arrangement, the light conduit 502 is substantially round, for example an optical fiber.

FIG. 5b depicts an alternative bar code reader in accordance with still another embodiment of the present invention. Referring to FIG. 5b, a barcode reader 516 is the same as the barcode reader 500 of FIG. 5a except the light source is ambient light 518.

The exemplary bar code reader 500 of FIG. 5a can also be configured as a bar code emulator and/or as pulsed light transceiver. Essentially, a barcode reader/emulator-light transceiver 520 can be operated in one of three modes depending on what it interfaces with at the first opening 504 of light conduit 502. As depicted in FIG. 5a, a first mode of the barcode reader/emulator-light transceiver 520 is to read a barcode via the first opening 504. In a second mode, the barcode reader/emulator-light transceiver 520 outputs pulsed light from a light source 510 in accordance with a barcode pattern so as to emulate a barcode to another barcode reader, a CardCard barcode reader 500 or 516, or another barcode reader/emulator-light transceiver 520. In a third mode, the light source 510 and the detector 514 function as a transmitter and a receiver of a On-Off-Keying (OOK) pulsed light transceiver, respectively. FIG. 5c depicts a barcode reader/emulator-light transceiver 520 operating as an OOK pulsed light transceiver with a second detector 522 and second light source 524 functioning as a second OOK pulse light transceiver, which might be implemented in the kiosk 402 of FIG. 4a, the CardCard data management device 408 of FIG. 4b, or another device.

FIG. 5d depicts a first barcode reader/emulator-light transceiver 520 and a second barcode reader/emulator-light transceiver 520 operating in the third (light transceiver) mode. The dashed arrows, if shown alone, could indicate the leftmost barcode reader/emulator-light transceiver 520 operating in the second (barcode emulator) mode and the rightmost barcode reader/emulator-light transceiver 520 operating in the first (barcode reader) mode. Similarly, the solid arrows, if shown alone, could indicate the rightmost barcode reader/emulator-light transceiver 520 operating in the first (barcode emulator) mode and the leftmost barcode reader/emulator-light transceiver 520 operating in the second (barcode reader) mode.

Figure 6A:
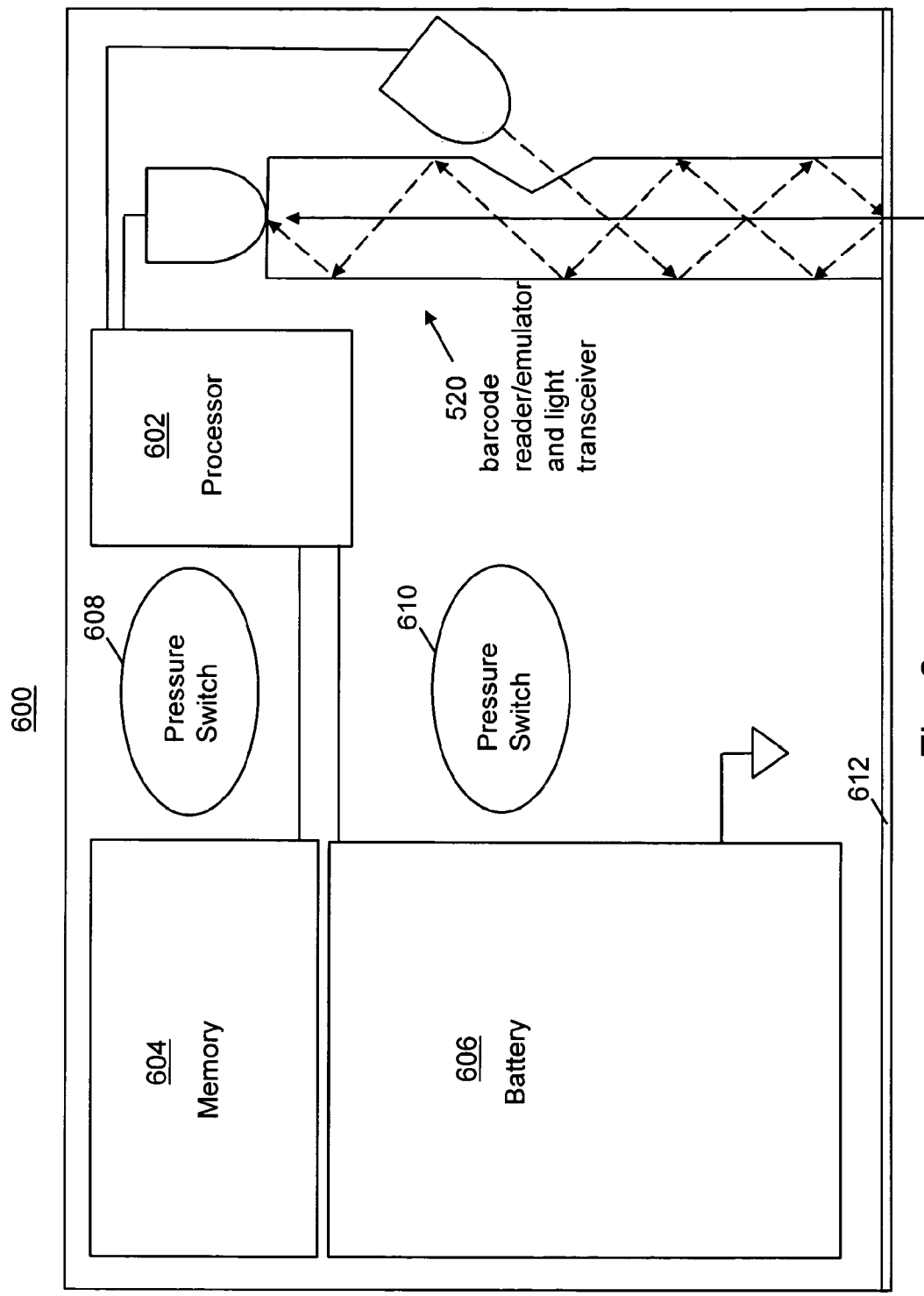
FIG. 6a depicts a first exemplary CardCard circuitry in accordance with one embodiment of the present invention.

FIG. 6*a* depicts a first exemplary CardCard circuitry 600 in accordance with one embodiment of the present invention. Referring to FIG. 6*a*, the first CardCard circuitry 600 includes a processor 602 that interfaces with a barcode reader/emulator-light transceiver 520, a memory 604, a battery 606, a first pressure switch 608, a second pressure switch 610, and a light waveguide 612. The processor 602 may also interface with one or more status indicators (not shown) to include one or more additional LEDs. The processor 602 may also interface with a display such as a touch screen, which might be used, for example, to display an entity icon, status information, or other entity information, and/or to provide an interface for selecting an entity or otherwise managing the functionality of the CardCard 104. Use of a display is discussed below in relation to FIGS. 13*a* and 13*b*.

Referring again to FIG. 6*a*, the pressure switch 608 is used, for example, to activate the barcode reader/emulator modes of the CardCard and the pressure switch 610 is, for example, used to activate the light transceiver mode of the CardCard. The light waveguide 612 enables any form of barcode reader to read the barcode emulator mode output of a barcode reader/emulator-light transceiver 520. Specifically, for the barcode emulator mode output to be read by a slot reader 308*a*, the CardCard only has to be placed into the slot reader 308*a* (i.e., it doesn't have to slide). A handheld reader 308*b* and a horizontal scanner 308*c* can read the output at any angle other than exactly parallel to the light waveguide 612, and a pen type barcode reader 308*d* can read the output by pointing the pen type barcode reader 308*d* at any location of the light waveguide 612, where the pen type barcode reader 308*d* does not move while reading the output. The light waveguide 612 also allows two (or more) CardCards to convey information using their respective barcode reader/emulator-light transceivers 520 by merely placing their respective light waveguides 612 close enough together such that light can traverse between them.

Under one arrangement, the light from the light source 510 is visible to the user of the CardCard thereby providing an indication of status. For example, after the first pressure switch 608 is activated by a user holding the top of the CardCard, the light source 510 would stay on continuously during the barcode reader mode as required to read the barcode of an entity, which might be located, for example, at a cash register. After successfully reading the barcode, the same light source 510 would begin operating in barcode emulator mode where it would rapidly flash on and off in accordance with the appropriate barcode for data card of the recognized entity. This flashing on and off would indicate the card was ready to insert into a barcode reader. Alternatively, the same light source 510 might flash on and off with a specific pattern to indicate whether the card was able to successfully recognize the barcode of the entity. Under another arrangement one or more other LEDs are used to indicate a mode of the card and/or status information.

Figure 6B:
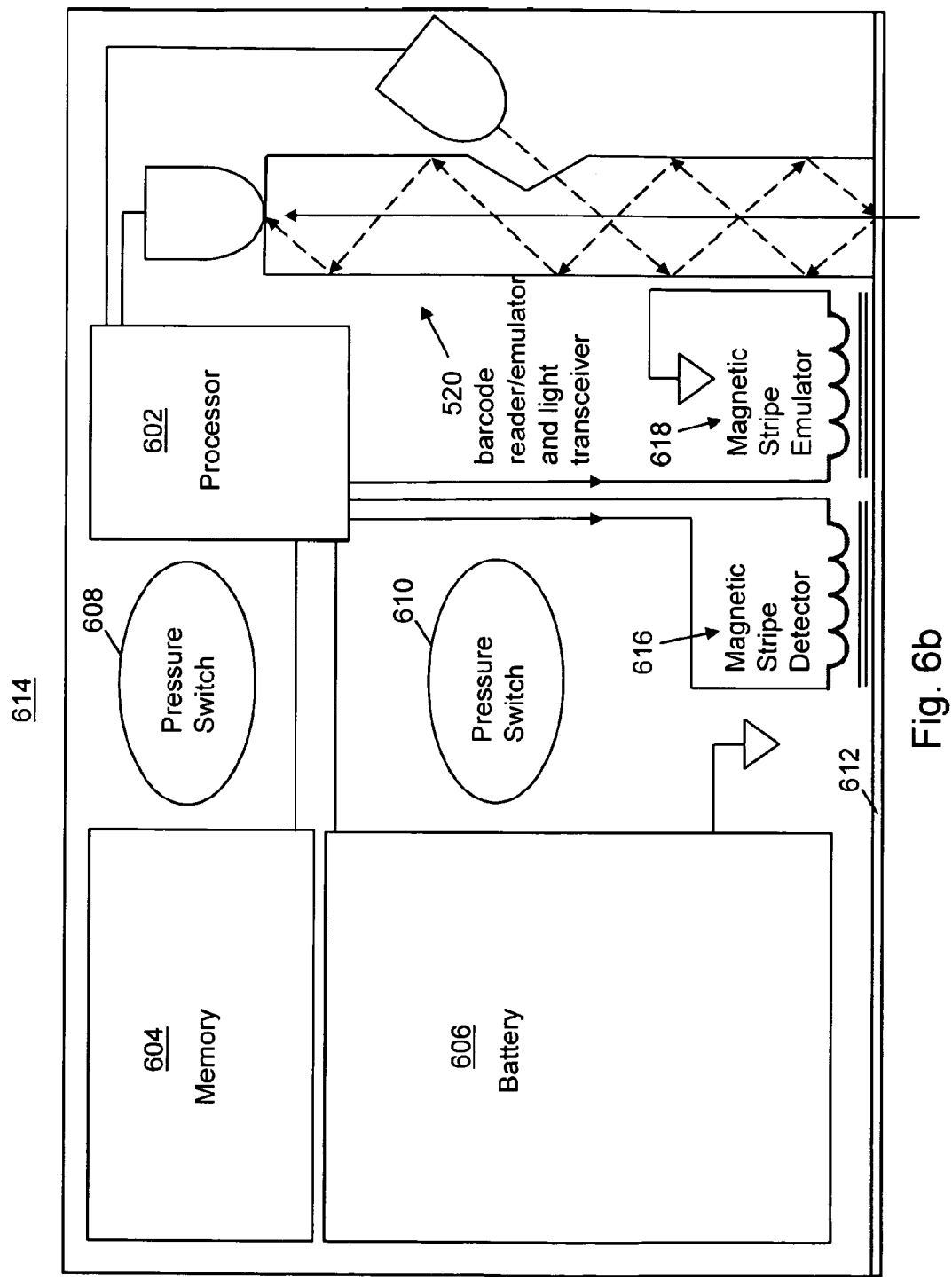
FIG. 6b depicts a second exemplary CardCard circuitry in accordance with another embodiment of the present invention.

FIG. 6*b* depicts a second exemplary CardCard circuitry 612 in accordance with another embodiment of the present invention. Referring to FIG. 6*b*, the second exemplary CardCard circuitry 614 is the same as the first exemplary CardCard circuitry 600 except it also includes circuitry corresponding to a magnetic stripe detector 616 and a magnetic stripe emulator 618. As such, the magnetic stripe detector 616 can be used in conjunction with the barcode reading mode of barcode reader/emulator-light transceiver 520 to obtain the magnetic stripe and barcode information related to a data card, or can be used to identify an entity, where an entity's magnetic stripe information may be read, for example, near a cash register. The magnetic stripe emulator 618 can also be used in conjunction with the barcode emulation mode of barcode reader/emulator-light transceiver 520 to convey the magnetic stripe and barcode information to corresponding reader devices, where the magnetic stripe emulator 618 generates a varying magnetic field corresponding to the information typically encoded on a magnetic stripe. A magnetic stripe detector 616 and a magnetic stripe emulator are described in U.S. Pat. No. 4,701,601, which is incorporated herein by reference. Alternative magnetic stripe detector/emulator approaches are described in U.S. Pat. No. 6,811,082, which is also incorporated herein by reference.

The combination of the magnetic strip detector 616 and the magnetic strip emulator 618 provides for three modes of operation similar to the three operational modes of the barcode reader/emulator-light transceiver 520. Specifically, the first mode is the magnetic stripe detector mode, the second mode is the magnetic stripe emulator mode, and the third mode is the magnetic field transceiver mode where data would be conveyed in accordance with a defined modulation scheme for modulating a magnetic field. As such, when the magnetic strip detector 616 and the magnetic strip emulator are operating in magnetic field transceiver mode with a second magnetic stripe detector and second magnetic stripe emulator then any form of data can be conveyed including information (or data) representing a barcode, an entity name, a logo, etc. A magnetic field transceiver is described in U.S. Pat. No. 3,551,795 incorporated herein by reference.

Figure 6C:
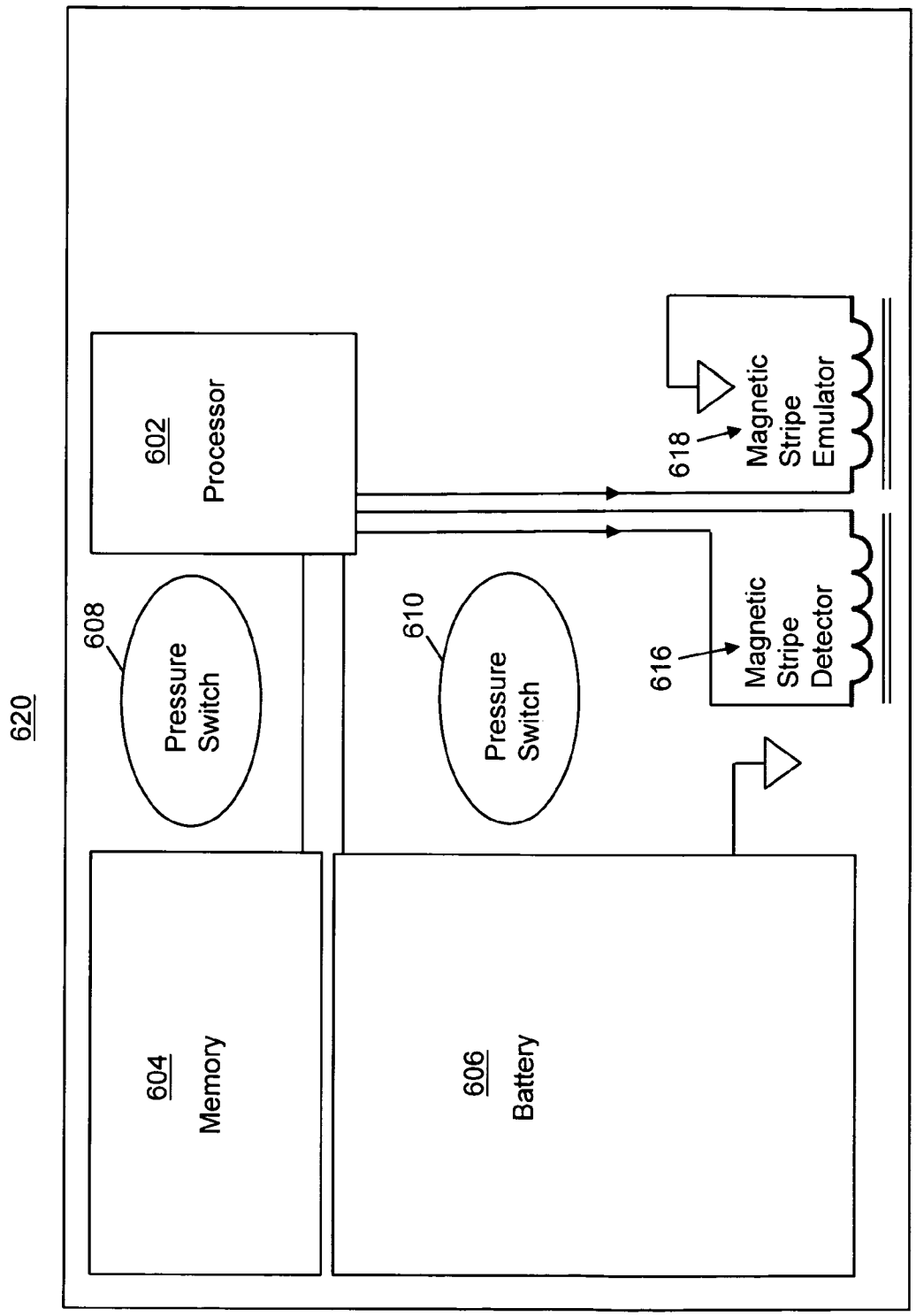
FIG. 6c depicts a third exemplary CardCard circuitry in accordance with yet another embodiment of the present invention.

FIG. 6*c* depicts a third exemplary CardCard circuitry 618 in accordance with yet another embodiment of the present invention. Referring to FIG. 6*c*, the third exemplary CardCard circuitry 620 is the same as the second exemplary CardCard circuitry 614 except it does not include circuitry corresponding to the barcode reader/emulator-light transceiver 520. As such, the magnetic stripe detector 616 can be used to obtain magnetic stripe information related to a data card and the magnetic stripe emulator 618 can be used to convey magnetic stripe information to a corresponding magnetic stripe reader device.

Figure 6D:
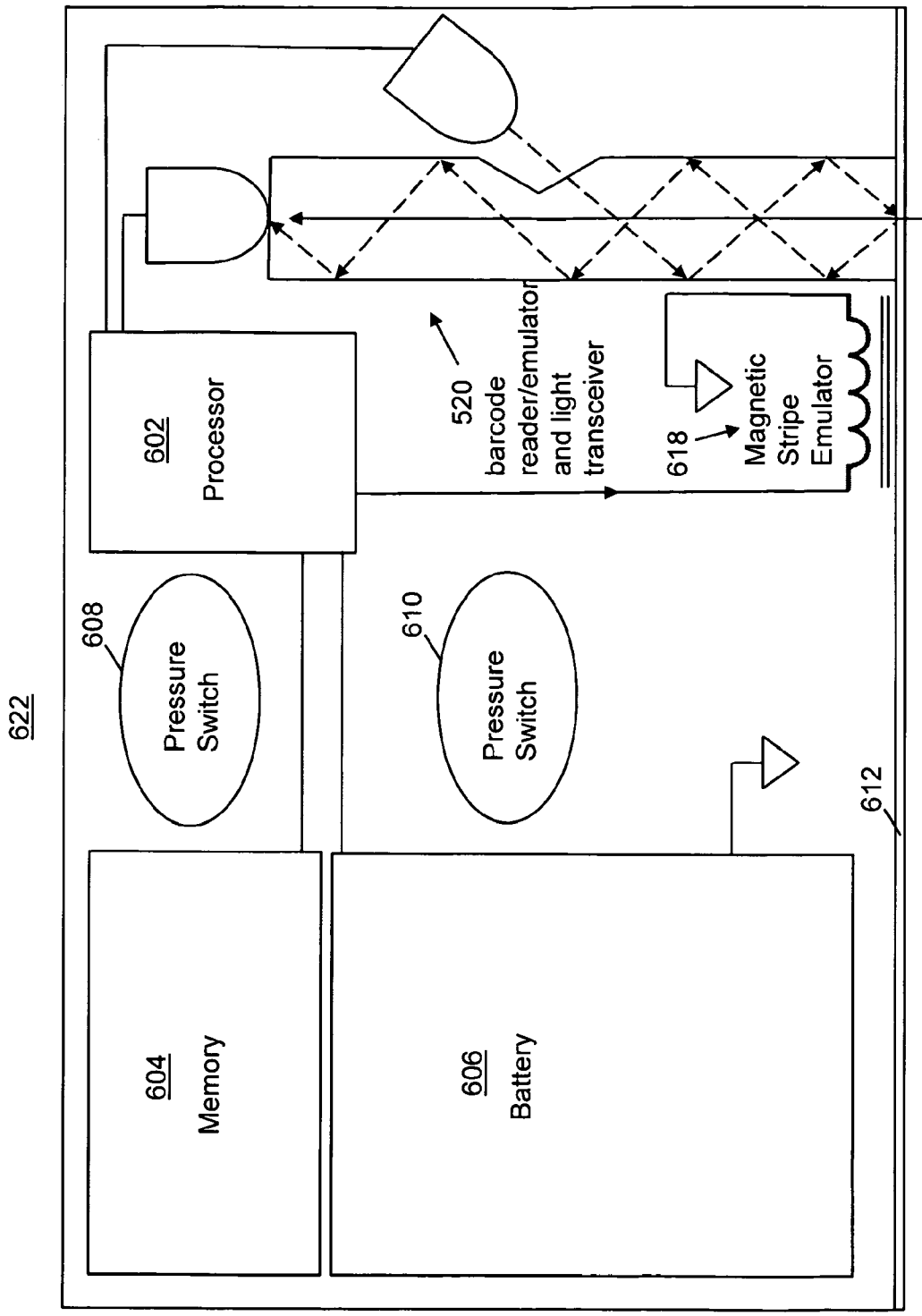
FIG. 6d depicts a fourth exemplary CardCard circuitry in accordance with yet another embodiment of the present invention.

FIG. 6*d* depicts a fourth exemplary CardCard circuitry 622 in accordance with still another embodiment of the present invention. Referring to FIG. 6*d*, the fourth exemplary CardCard circuitry 622 is the same as the second exemplary CardCard circuitry 614 except it does not include a magnetic stripe decoder 616. As such, any magnetic stripe information the CardCard obtains for use by the magnetic stripe emulator 618 to emulate a magnetic stripe must be received via barcode reader/emulator-light transceiver 520 operating in light transceiver mode.

Figure 6E:
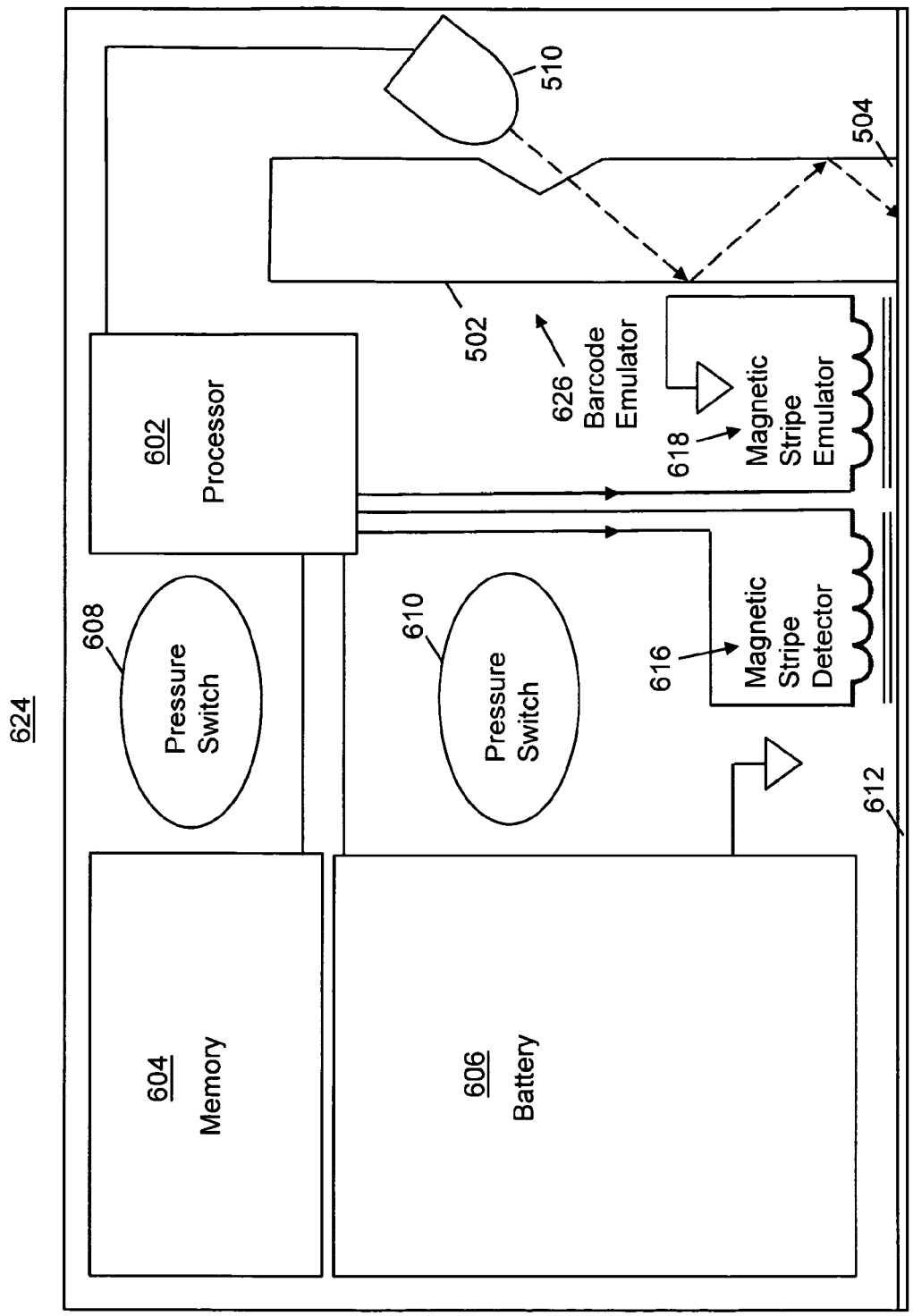
FIG. 6e depicts a fifth exemplary CardCard circuitry in accordance with a further embodiment of the present invention.

FIG. 6*e* depicts a fifth exemplary CardCard circuitry 624 in accordance with a further embodiment of the present invention. Referring to FIG. 6*e*, the fifth exemplary CardCard circuitry 624 is the same as the second exemplary CardCard circuitry 614 except it does not include a barcode reader/emulator-light transceiver 520. In place of the barcode reader/emulator-light transceiver 520 is a barcode emulator 626 comprising a light conduit 502 and a light source 510 used to produce barcode emulator output through opening 504 to light waveguide 612. As such, any barcode information the CardCard obtains for use by barcode emulator 626 to emulate a barcode must be received via magnetic stripe detector 616 when operating in magnetic field transceiver mode with magnetic stripe emulator 618.

Figure 6F:
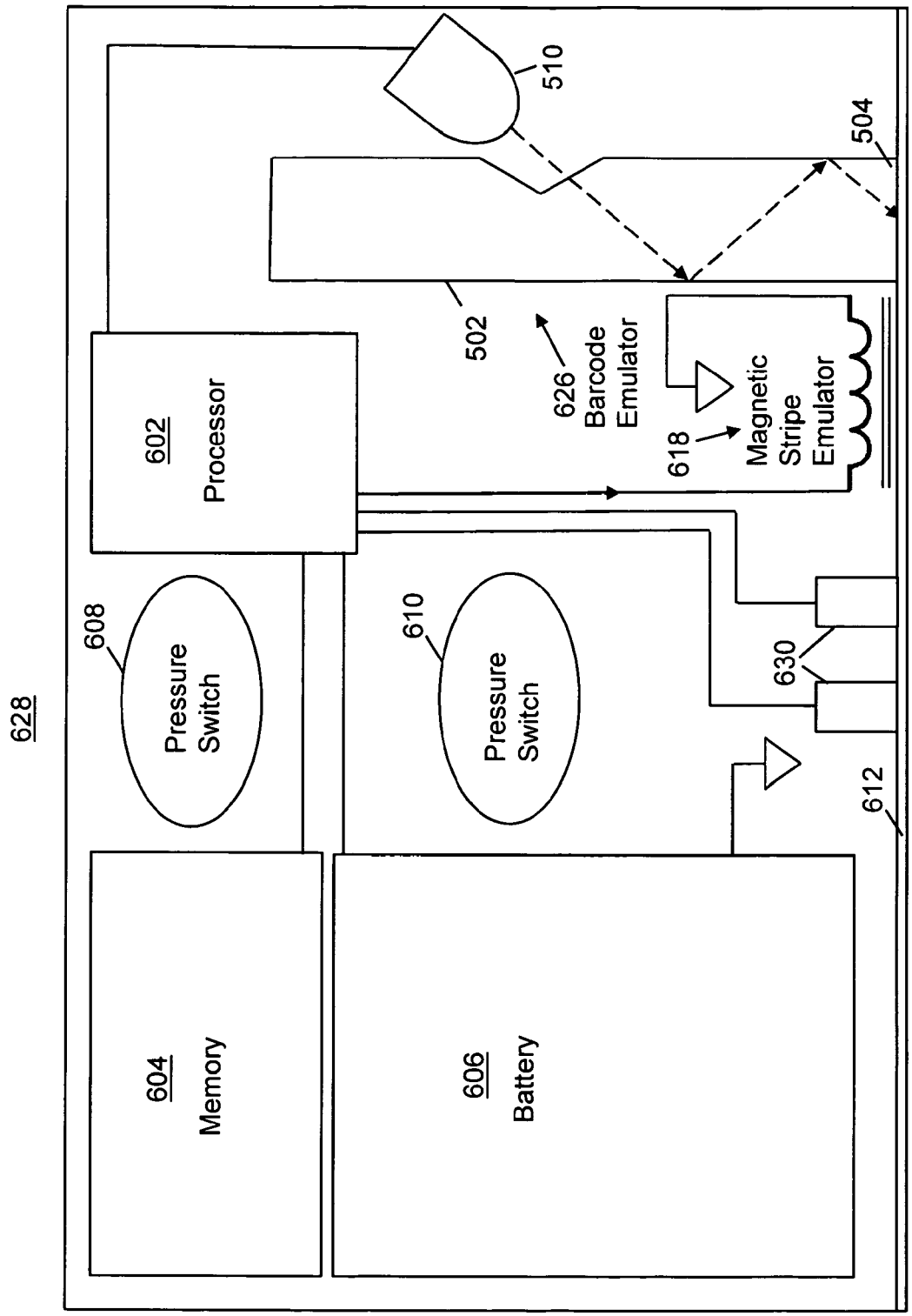
FIG. 6f depicts a sixth exemplary CardCard circuitry in accordance with a still further embodiment of the present invention.

FIG. 6f depicts a sixth exemplary CardCard circuitry 628 in accordance with a still further embodiment of the present invention. Referring to FIG. 6f, the sixth exemplary CardCard circuitry 628 is the same as the fifth exemplary CardCard circuitry 624 except it does not include a magnetic stripe detector 616 and it does include electrical contacts 630 used to provide a wired communications link to the processor 602. As such, any magnetic stripe or barcode information the CardCard obtains for use by the magnetic stripe emulator 618 to emulate a magnetic stripe or by the barcode emulator 626 to emulate a barcode must be received via electrical contacts 630.

In reference to the six exemplary CardCard circuitries 600, 614, 620, 622, 624, and 628 one skilled in the art will recognize that the locations of the various components can be varied, the number and type of switches can vary, and other changes can be made to the circuitry within the scope of the current invention such as extending the light waveguide 612 around one or more sides of the card. Furthermore, for the first five exemplary circuitries 600, 614, 620, 622, and 624, electrical contacts 630 like those in the sixth exemplary circuitry 628 could also be used to provide an interface to the processor 602 to enable an electrical circuit for wired communications between the CardCard 104 and a kiosk 402, a CardCard data management device 408, or some other device. Generally, various designs of the CardCard may be employed in accordance with the invention to achieve a desired a size, thickness, and/or flexibility, for example, the size, thickness, and flexibility of a typical credit card. Under one arrangement, the CardCard circuitry can be implemented using flexible circuit board technology. Alternatively, the CardCard circuitry can be implemented using rigid-flex circuit board technology or using rigid circuit board technology.

Figure 7:
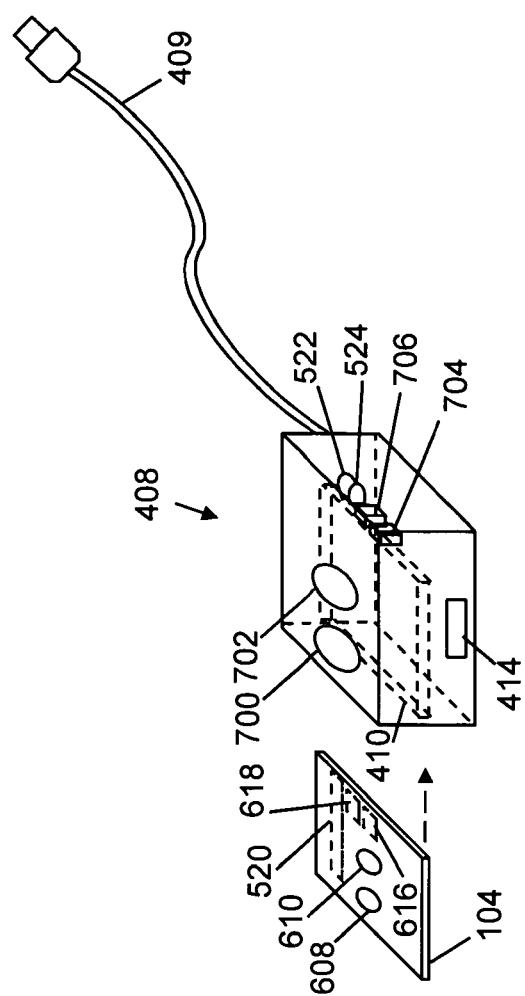
FIG. 7 depicts another view of the exemplary CardCard data management device previously depicted in FIG. 4b.

FIG. 7 depicts another view of the exemplary CardCard data management device 408 previously depicted in FIG. 4b that is configured to interface with the second exemplary CardCard circuitry 614. One skilled in the art will recognize that a CardCard data management device 408 can be configured to interface with any one or more of the six exemplary CardCard circuitries. One skilled in the art will also recognize that the basic circuitry used to interface with any one or more of the six exemplary CardCard circuitries can be employed in a kiosk 402 or some other device such as one tailored for an entity POS. Referring to FIG. 7, the CardCard data management device 408 has a USB cable 409 for connecting to a computer 302 and an additional USB port 414 for connecting to a barcode and/or magnetic stripe reading device such as those described in relation to FIG. 3. A CardCard 104 is inserted into the slot 410 of the CardCard data management device 408. The barcode reader/emulator-light transceiver 520 of the CardCard 104 is thereby aligned with a second detector 522 and a second light source 524 included in the CardCard data management device 408. Similarly, the magnetic stripe reader 616 and the magnetic stripe emulator 618 of the CardCard 104 are thereby aligned with second magnetic stripe emulator 704 and second magnetic stripe reader 706 of the CardCard data management device 408, respectively. Thereafter, CardCard data management device 408 can convey barcode and/or magnetic stripe information to and from CardCard 104 using any of several modes of communication. Specifically, CardCard data management device 408 can interface with the barcode reader/emulator-light transceiver 520 of the CardCard 104 using any of its three modes of operation (i.e., barcode reader mode, barcode emulator mode, or light transceiver mode). Using the light transceiver mode, information other than barcode information can be conveyed and other types of functions can be performed. Similarly, CardCard data management device 408 can interface with the magnetic stripe reader 616 and the magnetic stripe emulator 618 using any of their three modes of operation (i.e., magnetic stripe detector mode, magnetic stripe emulator mode, or magnetic field transceiver mode). Using the magnetic field transceiver mode, information other than magnetic stripe information can be conveyed and other types of functions can be performed. Furthermore, information other than barcode and magnetic stripe information can be conveyed and other types of functions can be performed using electrical contacts 630 (not shown).

Referring again to FIG. 7, the first and second activation buttons 700 and 702 are aligned with the first and second pressure switches 608 and 610, respectively, such that, when the first activation button 700 is pressed, pressure is applied to the first pressure switch 608 and, when the second activation button 702 is pressed, pressure is applied to the second pressure switch 610. As such, only the first activation button 700 can be pressed, only the second activation button 702 can be pressed, or the first activation button 700 and the second activation button 702 can be both pressed at the same time to control three activation states of the CardCard data management device 408. Control of the CardCard data management device 408 can also be provided via the computer 302 via USB cable 409.

The ability of the CardCard data management device 408 to interface with a computer system 300, to interface with a barcode and/or magnetic stripe reader device (connected to computer 302 data port 412 or to data management device 408 data port 414), and to interface with a CardCard 104 enables it to be used to populate information from multiple entity data cards onto a CardCard. Such interfaces enable it to be used by an entity to add its own information to a customer's card and alternatively enable a device to scan the memory of a customer's CardCard in order to find the barcode and/or magnetic stripe information for the data card corresponding to that entity. Furthermore, the CardCard data management device enables the CardCard to be used as a smart card whereby various types of information corresponding to customer transactions could be stored on the CardCard, such as account balances and the like. When used as a smart card, various well known security features would likely need to be employed such as data encryption and user authentication techniques such as requiring a PIN and/or employing biometric authentication techniques, for example, requiring a thumb print match. One or more of such security features can also be used when a CardCard is not being used as a smart card.

FIG. 8 depicts an exemplary CardCard Data Management System that could be executed on a computing system 300. Referring to FIG. 8, a display 304 provides a menu driven user interface for performing various actions related to information related to the CardCard 104 that is maintained in a local database maintained on a hard drive of the computer 302 of the computing system 300 and in a database maintained in the memory 604 of the CardCard 104. Ten functions are listed on the menu, but one skilled in the art will recognize that different functions, a different interface, or any of many different programs (or applications) can be used to manage CardCard data in accordance with the present invention. As shown, function #1 allows a user to manage information stored in a local database pertaining to entities offering data cards. Typically, a user would use function #1 to add, delete, or edit entity records. Similarly, function #2 allows a user to manage information stored in the memory of the CardCard corresponding to the entities for which the CardCard has respective data card information. Function #3 would be used to make changes to either database as appropriate to keep it current with changes made to the other database. Function #4 would automatically log on to a CardCard website (as described below) where information pertaining to entities, particularly vendors, would be available. Function #5 would log on to an entity website, perhaps to download entity data card information or to support a transaction. The entity may be identified via the computer 302 or may be selected via the CardCard. Function #6 would enable a CardCard to be erased of any or all information stored in the CardCard's memory. Function #7 would copy information contained in the memory of a CardCard into the memory of a different CardCard. Function #8 would allow the production of any one of several different types of reports concerning the local and/or CardCard databases or, for example, could list entity websites for which data card information is available. Functions #9 and #10 are intended for entities and could be used, for example, by a checkout clerk. Under one arrangement a customer of an entity would place their CardCard into a CardCard data management device 408 to enable the memory of the CardCard to be scanned using Function #9 to find the barcode and/or magnetic stripe information corresponding to the data card of the entity. Function #10 would append data card information pertaining to a new entity into the entity database stored on the CardCard. As such, this function could be used, for example, to add a customer to an entity's loyalty program while the customer is at a POS.

FIG. 9 depicts an exemplary CardCard website in accordance with one embodiment of the present invention. Referring to FIG. 9, a CardCard website display enables a CardCard Club member, who would typically pay a fee to be a member, to select entity types of interest by selecting a button next to the entity type shown in a first button group 902. Such entity types, shown as Entity Type A through Entity Type T would typically correspond to categories of entities such as grocery stores, flower shops, gas stations, auto repair, tire, auto dealerships, office supply, furniture stores, home improvement stores, etc. The display lists the entities having data cards for the selected entity types where buttons from a second group of buttons 904 can be selected to identify specific entities for which data card information can be automatically downloaded. Typically, such information would be downloaded to a CardCard Club member's computer system 300 and then to the member's CardCard via a CardCard data management device 408 and a CardCard Data Management System or similar utility program. The CardCard website provides an easy to use interface for accessing data card information corresponding to a large number of entities, which can be categorized in various ways (e.g., small business, environment friendly, etc.) in order to tailor the entities listed to the member's tastes and desires. Because of its utility, entities can be charged a premium to advertise on the site in an attempt to convince the member to select them. As shown, the website might have one or more sponsors that are always shown or perhaps shown at different times or to users living in certain regions. Logos or advertisements by entities of the selected entity types of interest can be displayed. Generally, any of many well known methods used to sell advertisement/marketing space on a website can be employed in accordance with the present invention.

FIG. 10a depicts an exemplary magnetic stripe 1000 that can be used to identify an entity, for example, a store from which a CardCard user has received a data card.

FIG. 10b depicts an exemplary barcode 1002 that can be used to identify an entity, for example, a store from which a CardCard user has received a data card.

FIG. 10c depicts a top down view of an exemplary entity identifying device 1004 having a magnetic stripe 1000 along one side of a slot as indicated by a thicker line. As shown, a CardCard 104 can be passed through the slot of the entity identifying device 1004 and the magnetic stripe reader 616 of the CardCard 104 can be used to read the magnetic stripe information corresponding to the entity to thereby identify the entity.

FIG. 10d depicts a top down view of an exemplary entity identifying device 1004 having a barcode 1002 along the bottom of a slot. As shown, CardCard 104 can be passed through the slot of the entity identifying device 1004 and the barcode reader mode of barcode reader/emulator-light transceiver 520 or of barcode reader 500 or 516 of the CardCard 104 can be used to read the barcode information corresponding to the entity to thereby identify the entity.

FIG. 10e depicts a top down view of an exemplary entity identifying device 1004 having a magnetic stripe along one side of a slot and a barcode along the bottom of the slot. As shown, a CardCard 104 can be passed through the slot of the entity identifying device 1004 and the barcode reader/emulator-light transceiver 520 and the magnetic stripe reader 616 of the CardCard 104 can be used to read the barcode information and the magnetic stripe information corresponding to the entity to thereby identify the entity.

FIG. 10f depicts a first three dimensional view of an exemplary entity identifying device.

FIG. 10g depicts a second three dimensional view of an exemplary entity identifying device.

FIG. 11 depicts an exemplary usage of a CardCard at an entity point-of-sale 1100. Referring to FIG. 11, the point-of-sale 1100 includes a point-of-sale terminal 1102, a credit card reader 1104, a register counter 1106, and a horizontal scanner 308c. In accordance with the present invention a customer having information pertaining to the entity's data card loaded into his or her CardCard 104 can pass the card over magnetic stripe 1000 or barcode 1002, or can pass the card through an entity identifying device 1004 associated with the point-of-sale 1100 to identify the entity to the CardCard. Thereafter, the CardCard would configure itself to output the magnetic stripe and/or barcode information when placed into credit card reader 1104. If the customer has not previously populated the entity's information into the CardCard, then a CardCard data management device 408 can be used at the POS 1100 to add the entity's information to the CardCard. A CardCard data management device 408, or similar device, can also be used as shown, or as mounted where a customer can access it, to use the CardCard for two-way transactions, where the CardCard functions as a smart card. If two-way communications are employed, the identity of the entity can be conveyed as part of the communications thereby eliminating the requirement for the user to identify the entity as described above. A CardCard data management device 408, or similar device, can also be used to scan the memory of a CardCard to search for data card information corresponding to an entity data card.

Figure 12:
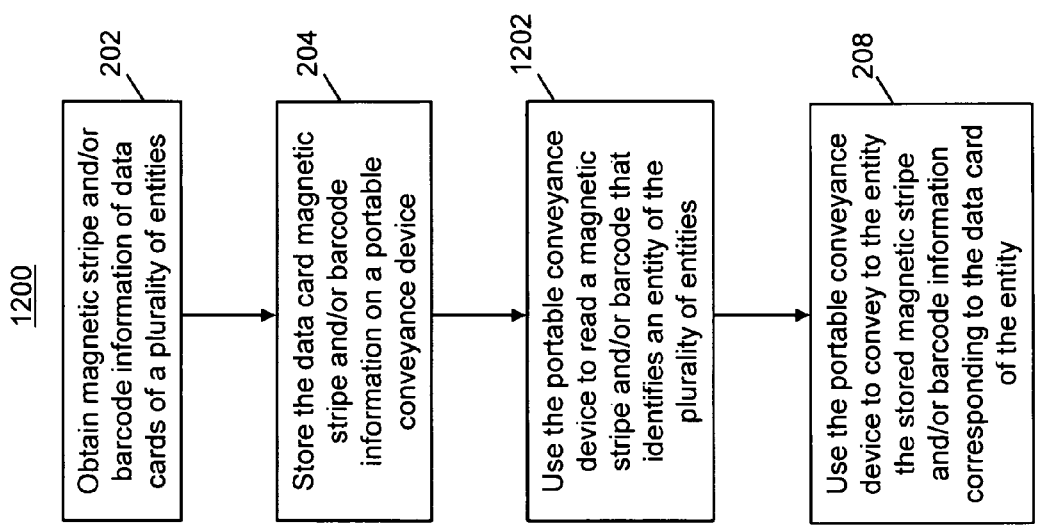
FIG. 12 depicts an exemplary method corresponding to usage of a CardCard at an entity point-of-sale.

FIG. 12 depicts an exemplary second method corresponding to usage of a CardCard at an entity point-of-sale as depicted in FIG. 11. Referring to FIG. 12, the second method 1200 is the same as the first method 200 except the third step 206 of distinguishing an entity of the first method 200 is more specifically defined in the third step 1202 of the second method 1200, as using the portable conveyance device to read a magnetic stripe and/or barcode that identifies an entity of the plurality of entities for which the stored magnetic stripe and/or barcode information of the data card of the entity is required (for the POS). Thus, as shown in FIG. 11, a customer having a CardCard at an entity's POS (e.g., a grocery store checkout register) could use the CardCard's magnetic stripe and/or barcode reader capabilities to read a magnetic stripe and/or barcode to identify the entity. Thereafter, the CardCard would output the appropriate magnetic stripe and/or barcode information corresponding to the data card of the entity. As such, from a customer's perspective, it would be very simple and intuitive to swipe the CardCard through an entity identifying device 1004 prior to using the CardCard with the data card reader of the entity. Depending on which of the possible configurations for the CardCard and/or a data card reader that is employed, any of various modes for identifying the entity prior to conveying the appropriate magnetic stripe and/or barcode information corresponding to the data card of the entity can be used in accordance with the invention including swiping the CardCard through one or more devices, touching the CardCard to one or more devices, and/or inserting the CardCard into one or more devices, and various combinations thereof. Ideally, a CardCard would only have to be inserted, touched, or placed into a single device, for example one configured similar to a CardCard data management device 408, to identify the entity and output the appropriate information. But, this approach would require the modification of existing POS infrastructure to include such a device. Because such modifications occur over time, it is very likely that a version of the CardCard will at some point be configured to work with existing infrastructure and with a single device.

FIG. 13a depicts an exemplary CardCard display. Referring to FIG. 13a, a CardCard 104 has on one side a touch screen display 1300. The touch screen display 1300 has a first group of icons 1302 used to identify an entity type of interest (or category). A first Right Arrow 1304 and a first Left Arrow 1306 are used to cause the first group of icons 1302 displayed above to shift right or left. A user can at any time select an icon by pressing it thereby selecting an entity type of interest where typically the selected icon could somehow be identified (e.g., by a different brightness level, color, thicker border, etc.). Based on the selected entity type of interest, the entities populated in the CardCard that correspond to the selected entity type would be displayed in a second group of icons 1308 used to identify the entity for which the CardCard should output the magnetic stripe and/or barcode information corresponding to the data card of the selected entity. A second Right Arrow 1310 and a second Left Arrow 1312 are used to cause the second group of icons 1308 displayed above to shift right or left. A user can at any time select an icon by pressing it thereby selecting an entity where typically the selected icon could somehow be identified (e.g., by a different brightness level, color, thicker border, etc.). Thereafter, the CardCard 104 would output the magnetic stripe and/or barcode information corresponding to the data card of the selected entity. It should be noted that in FIG. 13a the CardCard is oriented in what is commonly referred to as a portrait orientation (instead of landscape orientation). The CardCard could alternatively be oriented in a landscape orientation and could be configured to recognize how it is being held by a user to change the orientation of the display from portrait to landscape and vice versa.

Figure 13B:
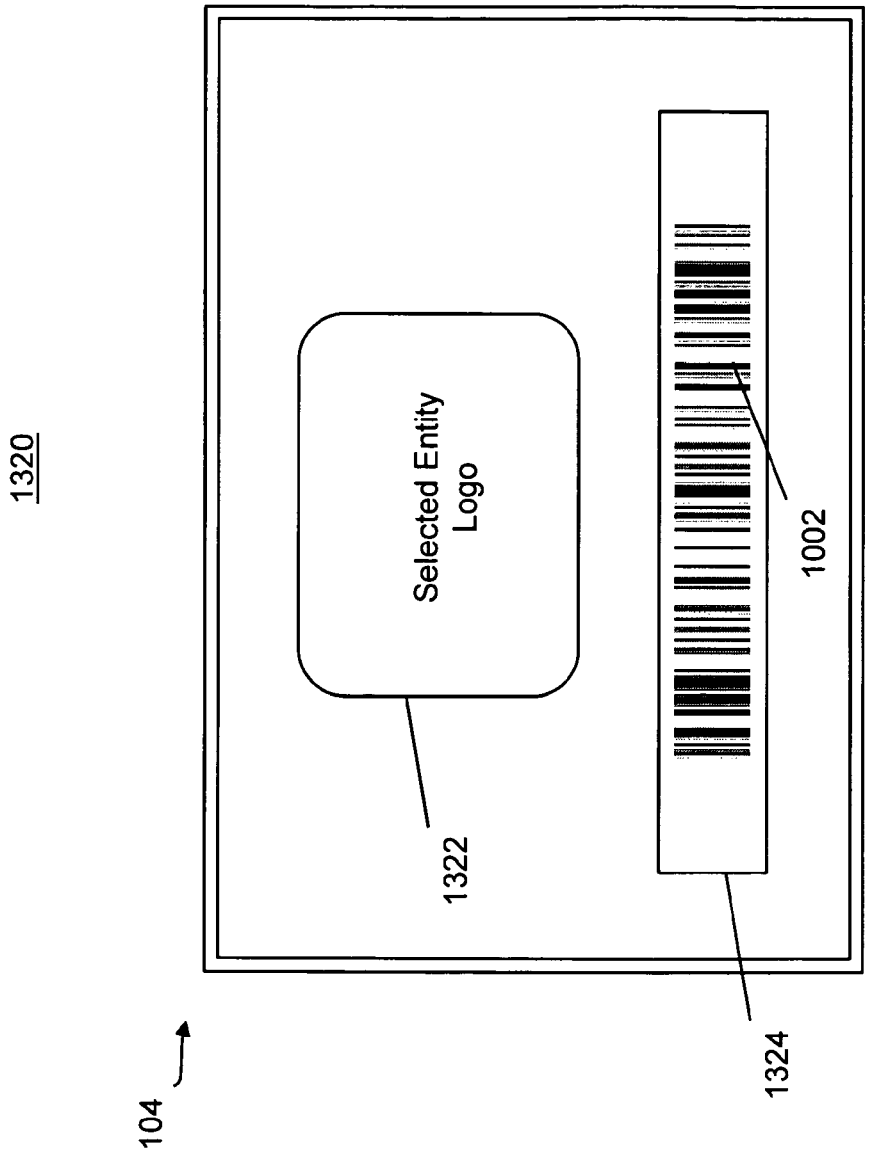
FIG. 13b depicts another exemplary CardCard display.

FIG. 13b depicts a second exemplary CardCard display. Referring to FIG. 13b, a second display 1320 is shown on one side of CardCard 104. The second display 1320 includes a logo display area 1322 where a logo of the selected entity is displayed to identify the entity. The second display 1320 also includes a barcode display area 1324 used to display a barcode corresponding to the data card of the entity such that it can be read by a barcode reading device. It should be noted that in FIG. 13b the CardCard is oriented in what is commonly referred to as a landscape orientation. The CardCard could alternatively be oriented in a portrait orientation and could be configured to recognize how it is being held by a user to change the orientation of the display from portrait to landscape and vice versa.

Although not required, the CardCard 104 could have substantially the same shape (i.e., length, width, and thickness) of a conventional credit card so it could be swiped through a conventional card reader and could fit in a wallet storage slot as would a conventional credit card. However, the CardCard does not necessarily have to resemble a credit card or a data card. The portable conveyance device of the present invention may alternatively be a cellular phone, a smart phone, a PDA, a watch, a keychain, or any other portable device incorporating circuitry comparable to the exemplary CardCard circuitry previously described. Such devices may utilize a non-battery power source that can be used instead of a battery 606 and may have various controls that can be used instead of pressure switches 608 and 610. Such devices may or may not include a component that can be inserted into a slot reader. For example, an Apple IPhone could be modified to include appropriate CardCard circuitry and have a display interface to select an entity similar to what was described in relation to FIG. 13a (except the arrows would not be required since the IPhone interface allows a user to use a left or right swipe to vary the icons displayed).

Figure 14:
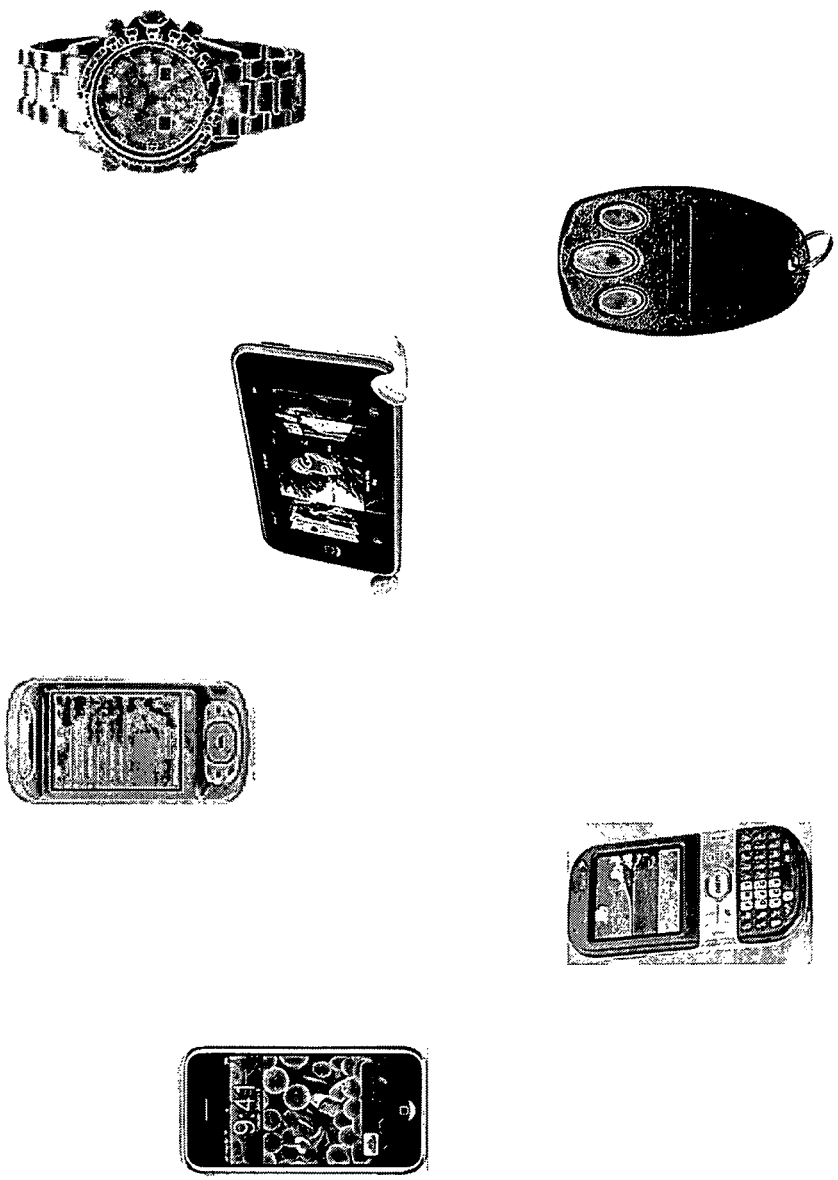
FIG. 14 depicts examples of various types of devices that could employ CardCard circuitry to enable them to provide CardCard functionality.

FIG. 14 depicts examples of various types of devices that could employ CardCard circuitry to enable them to provide CardCard functionality such as described above.

In an alternative embodiment of the invention, the CardCard would be configured to receive a RF transmission, for example, a RFID transmission that identifies an entity, for example, the store in which the CardCard is located, causing it to display the logo and barcode corresponding to that entity (as with FIG. 13b).

In still another embodiment of the invention, the CardCard would have a voice recognition capability allowing the user to provide a voice command to identify the entity causing it to display the logo and barcode corresponding to that entity.

In yet another embodiment of the invention an entity of interest is not identified in which case when activated the CardCard would repeat the sequence of all barcodes (or subset of barcodes determined via an interface) on the CardCard and the entity would recognize the barcode that corresponds to the entity.

While particular embodiments of the invention have been described, it will be understood, however, that the invention is not limited thereto, since modifications may be made by those skilled in the art, particularly in light of the foregoing teachings.

We claim:

1. A method for conveying data card information, comprising:

associating at least one of a bar code reader or a magnetic stripe detector with a data conveyance device;

associating at least one of a bar code emulator or a magnetic stripe emulator with said data conveyance device;

obtaining a plurality of data card information sets, each data card information set of said plurality of data card information sets corresponding to a respective data card of a plurality of data cards, each data card of said plurality of data cards corresponding to a respective entity of a plurality of entities;

storing on said data conveyance device said plurality of data card information sets;

using at least one of said bar code reader or said magnetic stripe detector associated with said data conveyance device to identify a first entity of said plurality of entities; and using at least one of said bar code emulator or said magnetic stripe emulator associated with said data conveyance device to convey a first data card information set corresponding to said first entity.

2. The method of claim 1, wherein said data conveyance device comprises at least one of a data card, a cellular phone, a smart phone, a PDA, a watch, a keychain, a kiosk, a point-of-sale device, or a data management device.

3. The method of claim 1, wherein said data conveyance device is portable.

4. The method of claim 1, wherein said data card information comprises at least one of an identifier for the entity, barcode information, magnetic stripe information, or a logo.

5. The method of claim 1, wherein said data card information supports a transaction.

6. The method of claim 1, wherein said data card information was provided by a website.

7. The method of claim 1, wherein said data card information was provided by a kiosk.

8. A system for conveying data card information, comprising:

a first data conveyance device comprising:

at least one of a first bar code reader or a first magnetic stripe detector for identifying an entity based on at least one bar code or magnetic stripe associated with the entity;

at least one of a first bar code emulator or a first magnetic stripe emulator for conveying a first data card information set corresponding to a data card corresponding to said entity; and a memory for storing a plurality of data card information sets of a plurality of data cards corresponding to a plurality of entities; and a second data conveyance device comprising:

at least one of a second bar code reader or a second magnetic stripe detector for receiving said first data card information set.

9. The system of claim 8, wherein one of said first data conveyance device or said second data conveyance device is incorporated with at least one of a data card, a cellular phone, a smart phone, a PDA, a watch, a keychain, a kiosk, a point-of-sale device, or a data management device.

10. The system of claim 8, wherein said first data conveyance device comprises at least one of a first memory, a first battery, a first switch, a first light waveguide, a first status indicator, or a first display.

11. The system of claim 8, wherein said first data conveyance device comprises a first pulsed light transceiver and said second conveyance device comprises a second pulsed light transceiver.

12. The system of claim 11, wherein said first pulsed light transceiver and said second pulsed light transceiver are configured to convey information using on-off-keying.

13. The system of claim 11, wherein said first pulsed light transceiver comprises at least one light emitting diode.

14. The system of claim 11, wherein said first pulsed light transceiver comprises an ambient light source.

15. The system of claim 11, wherein said second pulsed light transceiver comprises at least one light emitting diode.

16. The system of claim 8, wherein said first data conveyance device comprises a first magnetic field transceiver and said second conveyance device comprises a second magnetic field transceiver.

17. The system of claim 8, wherein said first data conveyance device comprises:

a first light conduit having a first opening at a first end, a second opening at a second end opposite said first end, and a side opening between said first opening and said second opening;

a first light source, said first light source configured for outputting a first light that initially enters said first light conduit through said side opening, reflects off said first light conduit, and exits said first light conduit through said first opening;

a first detector for detecting a second light exiting said second opening; and a first processor interfaced with said first detector, said first processor configured for conveying data based on at least one of said first light or said second light.

18. The system of claim 17, wherein said second data conveyance device comprises:

a second light source, said second light source configured for outputting said second light, said second light initially entering said first light conduit through said first opening and exiting said first light conduit through said second opening;

a second detector for detecting said first light after having exited said first light conduit through said first opening; and a second processor interfaced with said second light source and said second detector, said second processor configured for conveying data based on at least one of said first light or said second light.

19. The system of claim 18, wherein said second light source is configure for outputting said second light that initially enters said second light conduit through a side opening in said second light conduit.

20. The system of claim 8, wherein said second data conveyance device comprises at least one of a second memory, a second battery, a second switch, a second light waveguide, a second status indicator, or a second display.

\* \* \* \* \*